United States Patent [19]

Nakayama et al.

[11] Patent Number: 5,499,537

[45] Date of Patent: Mar. 19, 1996

[54] APPARATUS FOR DETECTING MISFIRE IN INTERNAL COMBUSTION ENGINE

[75] Inventors: Masaaki Nakayama, Toyoake; Yasutoshi Baba, Chiryu; Takehiko Terada, Kariya; Shuji Sakakibara, Okazaki; Kenji Yamamoto, Anjo, all of Japan

[73] Assignee: Nippondenso Co., Ltd., Kariya, Japan

[21] Appl. No.: 363,211

[22] Filed: Dec. 23, 1994

[30] Foreign Application Priority Data

| Dec. 24, 1993 | [JP] | Japan | 5-328643 |
| Mar. 24, 1994 | [JP] | Japan | 6-053681 |
| Aug. 5, 1994 | [JP] | Japan | 6-184848 |
| Nov. 18, 1994 | [JP] | Japan | 6-285343 |

[51] Int. Cl.$^6$ .............................. G01M 15/00
[52] U.S. Cl. ................ 73/117.3; 364/431.08
[58] Field of Search ................ 73/116, 117.3; 364/431.08; 123/419, 436

[56] References Cited

U.S. PATENT DOCUMENTS

| 4,887,215 | 12/1989 | Kumagai et al. | 73/117.3 |
| 4,931,940 | 6/1990 | Ogawa et al. | 73/116 |
| 5,222,392 | 6/1993 | Baba et al. | 73/116 |
| 5,263,364 | 11/1993 | Nakayama et al. | 73/116 |
| 5,275,037 | 1/1994 | Nakayama et al. | 73/117.3 |
| 5,287,736 | 2/1994 | Nakayama et al. | |
| 5,309,756 | 5/1994 | Osawa et al. | 73/116 |
| 5,337,240 | 8/1994 | Nakagawa et al. | 73/117.3 |
| 5,353,634 | 10/1994 | Baba et al. | 73/116 |
| 5,361,629 | 11/1994 | McCombie | 73/117.3 |
| 5,373,732 | 12/1994 | Kuroda et al. | 73/117.3 |

FOREIGN PATENT DOCUMENTS

| 3260356 | 11/1991 | Japan . |
| 4365958 | 12/1992 | Japan . |
| 5149191 | 6/1993 | Japan . |

Primary Examiner—Richard Chilcot
Assistant Examiner—Eric S. McCall
Attorney, Agent, or Firm—Cushman Darby & Cushman

[57] ABSTRACT

A rotation signal outputting device outputs a rotation signal at every predetermined rotational angle of an engine output shaft. An actual measurement value calculating device measures an amount of time spent by multiple engine cylinders in rotation between predetermined rotational angles during an expansion stroke, the measurements being made based on rotation signals output by the rotation signal outputting device. The actual measurement value calculating device also calculates an actual measurement value in response to the measured time interval. A first variation amount calculating device calculates a first difference between actual measurement values in two cylinders of the engine, and calculates a first variation amount in response to the calculated first different. A second variation amount calculating device calculates a second difference between a current first variation amount and a previous first variation amount calculated during a time which precedes a time of calculation of the current first variation amount by a period equal to an integer times a crank angle of 360 degrees in the engine. The second variation amount calculating device also calculates a second variation amount in response to the calculated Second difference. A smoothing device smooths the second variation amount into a third variation amount. A consecutive misfire detecting device detects a misfiring condition in response to the third variation amount.

24 Claims, 17 Drawing Sheets

5,499,537

APPARATUS FOR DETECTING MISFIRE IN INTERNAL COMBUSTION ENGINE

BACKGROUND OF THE INVENTION

1. Field of the Invention

This invention relates to an apparatus for detecting the occurrence of a misfire in an internal combustion engine such as a multi-cylinder internal combustion engine.

2. Description of the Related Art

Japanese published unexamined patent application 4-365958 corresponding to U.S. Pat. No. 5,275,037 discloses an apparatus for detecting the occurrence of a misfire in an internal combustion engine. The apparatus of Japanese application 4-365958 responds to a rotation signal which is output from a rotational angle sensor in accordance with the rotation of the crankshaft of the engine at every predetermined rotational angle of the engine crankshaft. In addition, the apparatus successively calculates an amount of time taken for revolution of the engine crankshaft by a predetermined crank angle on the basis of the rotation signals. The apparatus then sets first and second decision values on the basis of the calculated times in connection with two cylinders of the engine which successively take explosion strokes. The second decision value is set at a timing of 360 degrees in the engine crankshaft rotational angle previous to a timing of the setting of the first decision value. The occurrence of a misfire is detected on the basis of the first and second decision values.

Japanese published unexamined patent application 5-149191 corresponding to U.S. Pat. No. 5,287,736 discloses a misfire detecting apparatus for a multi-cylinder internal combustion engine. In the apparatus of Japanese application 5-149191, a rotation signal outputting unit outputs a rotary signal at every predetermined rotary angle, and a tentative misfire decision unit tentatively decides, on the basis of the rotary signal, whether or not misfire has occurred in each of cylinders of the engine. In addition, a tentative misfire number counting unit counts the number of tentative misfires decided for the respective cylinders, and a counting result storage unit stores the counting results. After a given number of tentative misfire decisions have been made, it is decided that a misfire has actually occurred only if the counting result, for a part of the cylinders, among the counting results for the respective cylinders stored in the counting result storage unit is larger than a predetermined number.

SUMMARY OF THE INVENTION

It is an object of this invention to provide an improved apparatus for detecting the occurrence of a misfire in an internal combustion engine.

A first aspect of this invention provides a misfire detecting apparatus for an internal combustion engine which comprises rotation signal outputting means for outputting a rotation signal at every predetermined rotational angle in accordance with rotation of an output shaft of an internal combustion engine; actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval; first variation amount calculating means for calculating a first difference between actual measurement values, calculated by the actual measurement value calculating means, in two cylinders of the engine which successively fall into expansion strokes, and for calculating a first variation amount in response to the calculated first difference; second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference; smoothing means for smoothing the second variation amount calculated by the second variation amount calculating means into a third variation amount; and consecutive misfire detecting means for detecting misfire in response to the third variation amount.

A second aspect of this invention includes the first aspect thereof, and additionally features that the consecutive misfire detecting means comprises means for comparing a predetermined value and the third variation amount, and means for detecting misfire in response to a result of the comparing by the comparing means.

A third aspect of this invention includes the second aspect thereof, and additionally comprises intermittent misfire detecting means for detecting intermittent misfires which occur in one of cylinders of the engine.

A fourth aspect of this invention includes the third aspect thereof, and additionally comprises cylinder-dependent index calculating means for calculating an index for every cylinder of the engine, the index representing a degree of a dispersion of an occurrence frequency distribution of second variation amounts calculated by the second variation amount calculating means; and cylinder-dependent misfire decision value generating means for generating a misfire decision value for every cylinder of the engine in response to the index calculated by the index calculating means; the intermittent misfire detecting means comprising means for comparing the second variation amount calculated by the second variation amount calculating means and the misfire decision value generated by the misfire decision value generating means, and means for detecting intermittent misfires in response to a result of the comparison between the second variation amount and the misfire decision value.

A fifth aspect of this invention includes the fourth aspect thereof, and additionally features that the index calculated by the index calculating means agrees with a value of a cumulative percent point in the occurrence frequency distribution of the second variation amounts at which a cumulation of occurrence frequencies of higher second variation amounts reaches a predetermined percent; and that the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points; and misfire rate decision value generating means for generating the misfire decision value in response to the misfire occurrence rate detected by the misfire occurrence rate detecting means.

A sixth aspect of this invention includes the fifth aspect thereof, and additionally features that the misfire rate decision value generating means comprises reference value calculating means for calculating a reference value from the second variation amount related to the cylinder about which misfire is to be detected; added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value calculating means into the misfire decision value.

A seventh aspect of this invention includes the third aspect thereof, and additionally features that the second variation amount calculating means is operative for calculating a second difference between a current first variation amount calculated by the first variation amount calculating means and a previous first variation amount calculated by the first variation amount calculating means during a time which precedes a time of calculation of the current first variation amount by a period equal to twice a crank angle of 360 degrees in the engine, and for calculating a second variation amount in response to the calculated second difference; wherein there are further provided cylinder-dependent index calculating means for calculating an index for every cylinder of the engine, the index representing a degree of a dispersion of an occurrence frequency distribution of second variation amounts calculated by the second variation amount calculating means and occurring during normal ignition; and cylinder-dependent misfire decision value generating means for generating a misfire decision value for every cylinder of the engine in response to the index calculated by the index calculating means; and wherein the intermittent misfire detecting means is operative for comparing the second variation amount and the misfire decision value for every cylinder of the engine and thereby detecting intermittent misfires which occur in one of cylinders of the engine.

An eighth aspect of this invention includes the first aspect thereof, and additionally features that the consecutive misfire detecting means comprises means for calculating a maximum value of the third variation amount, means for calculating a minimum value of the third variation amount, and means for calculating a fourth variation amount in response to the maximum value of the third variation amount and the minimum value of the third variation amount, and means for detecting misfire in response to the fourth variation amount.

A ninth aspect of this invention includes the eighth aspect thereof, and additionally comprises intermittent misfire detecting means for detecting intermittent misfires which occur in one of cylinders of the engine.

A tenth aspect of this invention includes the ninth aspect thereof, and additionally comprises cylinder-dependent index calculating means for calculating an index for every cylinder of the engine, the index representing a degree of a dispersion of an occurrence frequency distribution of second variation amounts calculated by the second variation amount calculating means; and cylinder-dependent misfire decision value generating means for generating a misfire decision value for every cylinder of the engine in response to the index calculated by the index calculating means; the intermittent misfire detecting means comprising means for comparing the second variation amount calculated by the second variation amount calculating means and the misfire decision value generated by the misfire decision value generating means, and means for detecting intermittent misfires in response to a result of the comparison between the second variation amount and the misfire decision value.

An eleventh aspect of this invention includes the tenth aspect of this invention, and additionally features that the index calculated by the index calculating means agrees with a value of a cumulative percent point in the occurrence frequency distribution of the second variation amounts at which a cumulation of occurrence frequencies of higher second variation amounts reaches a predetermined percent: and that the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points: and misfire rate decision value generating means for generating the misfire decision value in response to the misfire occurrence rate detected by the misfire occurrence rate detecting means.

A twelfth aspect of this invention includes the eleventh aspect thereof, and additionally features that the misfire rate decision value generating means comprises reference value calculating means for calculating a reference value from the second variation amount related to the cylinder about which misfire is to be detected: added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value calculating means into the misfire decision value.

A thirteenth aspect of this invention includes the ninth aspect thereof, and additionally features that the second variation amount calculating means is operative for calculating a second difference between a current first variation amount calculated by the first variation amount calculating means and a previous first variation mount calculated by the first variation amount calculating means during a time which precedes a time of calculation of the current first variation amount by a period equal to twice a crank angle of 360 degrees in the engine, and for calculating a second variation amount in response to the calculated second difference; wherein there are further provided cylinder-dependent index calculating means for calculating an index for every cylinder of the engine, the index representing a degree of a dispersion of an occurrence frequency distribution of second variation amounts calculated by the second variation amount calculating means and occurring during normal ignition; and cylinder-dependent misfire decision value generating means for generating a misfire decision value for every cylinder of the engine in response to the index calculated by the index calculating means; and wherein the intermittent misfire detecting means is operative for comparing the second variation amount and the misfire decision value for every cylinder of the engine and thereby detecting intermittent misfires which occur in one of cylinders of the engine.

A fourteenth aspect of this invention provides a misfire detecting apparatus for an internal combustion engine which comprises rotation signal outputting means for outputting a rotation signal at every predetermined rotational angle in accordance with rotation of an output shaft of an internal combustion engine; actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval; first variation amount calculating means for calculating a first difference between actual measurement values, calculated by the actual measurement value calculating means, in two cylinders of the engine which successively fall into expansion strokes, and for calculating a first variation amount in response to the calculated first difference; second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference; cylinder-dependent index calculating means for calculating an index for every cylinder of the engine, the index representing a degree of a dispersion of an occurrence frequency distribution of second variation amounts calculated by the second variation amount calculating means; cylinder-dependent misfire decision value generating means for generating a misfire decision value for every cylinder of the engine in response to the index calculated by the index calculating means; and intermittent misfire detecting means for comparing the second variation amount calculated by the second variation amount calculating means and the misfire decision value generated by the misfire decision value generating means, and for detecting intermittent misfires in response to a result of the comparison between the second variation amount and the misfire decision value.

A fifteenth aspect of this invention includes the fourteenth aspect thereof, and additionally features that the index calculated by the index calculating means agrees with a value of a cumulative percent point in the occurrence frequency distribution of the second variation amounts at which a cumulation of occurrence frequencies of higher second variation amounts reaches a predetermined percent; and that the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points; and misfire rate decision value generating means for generating the misfire decision value in response to the misfire occurrence rate detected by the misfire occurrence rate detecting means.

A sixteenth aspect of this invention includes the fifteenth aspect thereof, and additionally features that the misfire rate decision value generating means comprises reference value calculating means for calculating a reference value from the second variation amount related to the cylinder about which misfire is to be detected; added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value calculating means into the misfire decision value.

A seventeenth aspect of this invention provides a misfire detecting apparatus for an internal combustion engine which comprises rotation signal outputting means for outputting a rotation signal at every predetermined rotational angle in accordance with rotation of an output shaft of an internal combustion engine; actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval; first variation amount calculating means for calculating a first difference between actual measurement values, calculated by the actual measurement value calculating means, in two cylinders of the engine which successively fall into expansion strokes, and for calculating a first variation amount in response to the calculated first difference; second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 720 degrees in the engine, and for calculating a second variation amount in response to the calculated second difference; cylinder-dependent index calculating means for calculating an index for every cylinder of the engine, the index representing a degree of a dispersion of an occurrence frequency distribution of second variation amounts calculated by the second variation amount calculating means and occurring during normal ignition; misfire decision value generating means for generating a misfire decision value for every cylinder of the engine in response to the index calculated by the index calculating means; and misfire deciding means for comparing the second variation amount calculated by the second variation amount calculating means and the misfire decision value generated by the misfire decision value generating means, and for deciding whether or not misfire occurs in the engine in response to a result of the comparison between the second variation amount and the misfire decision value.

An eighteenth aspect of this invention includes the seventeenth aspect thereof, and additionally features that the index calculating means comprises misfire exclusion level calculating means for calculating a misfire exclusion level, and means for calculating the index in response to second variation amounts which are calculated by the second variation amount calculating means and which are smaller than the misfire exclusion level calculated by the misfire exclusion level calculating means.

A nineteenth aspect of this invention includes the eighteenth aspect thereof, and additionally features that the misfire exclusion level calculating means comprises guard means for guarding the index calculated by the index calculating means and for converting the index into a guarded index, and means for calculating the misfire exclusion level in response to the guarded index.

A twentieth aspect of this invention includes the seventeenth aspect thereof, and additionally features that the misfire decision value generating means comprises means for calculating a product of a predetermined value and the index calculated by the index calculating means, and means for generating the misfire decision value in response to the product of the predetermined value and the index.

A twenty-first aspect of this invention includes the twentieth aspect thereof, and additionally features that the misfire decision value generating means comprises means for calculating a means among indexes calculated by the index calculating means for the respective cylinders of the engine, means for deciding whether or not the index for a cylinder, about which the misfire decision value is to be generated, is smaller than the mean, and means for generating the misfire decision value in response to the mean when the index for the cylinder, about which the misfire decision value is to be generated, is smaller than the mean.

A twenty-second aspect of this invention includes the seventeenth aspect thereof, and additionally comprises consecutive misfire detecting means for detecting misfire consecutively occurring in one of the cylinders.

DESCRIPTION OF THE PREFERRED EMBODIMENTS

FIRST EMBODIMENT

Figure 1:
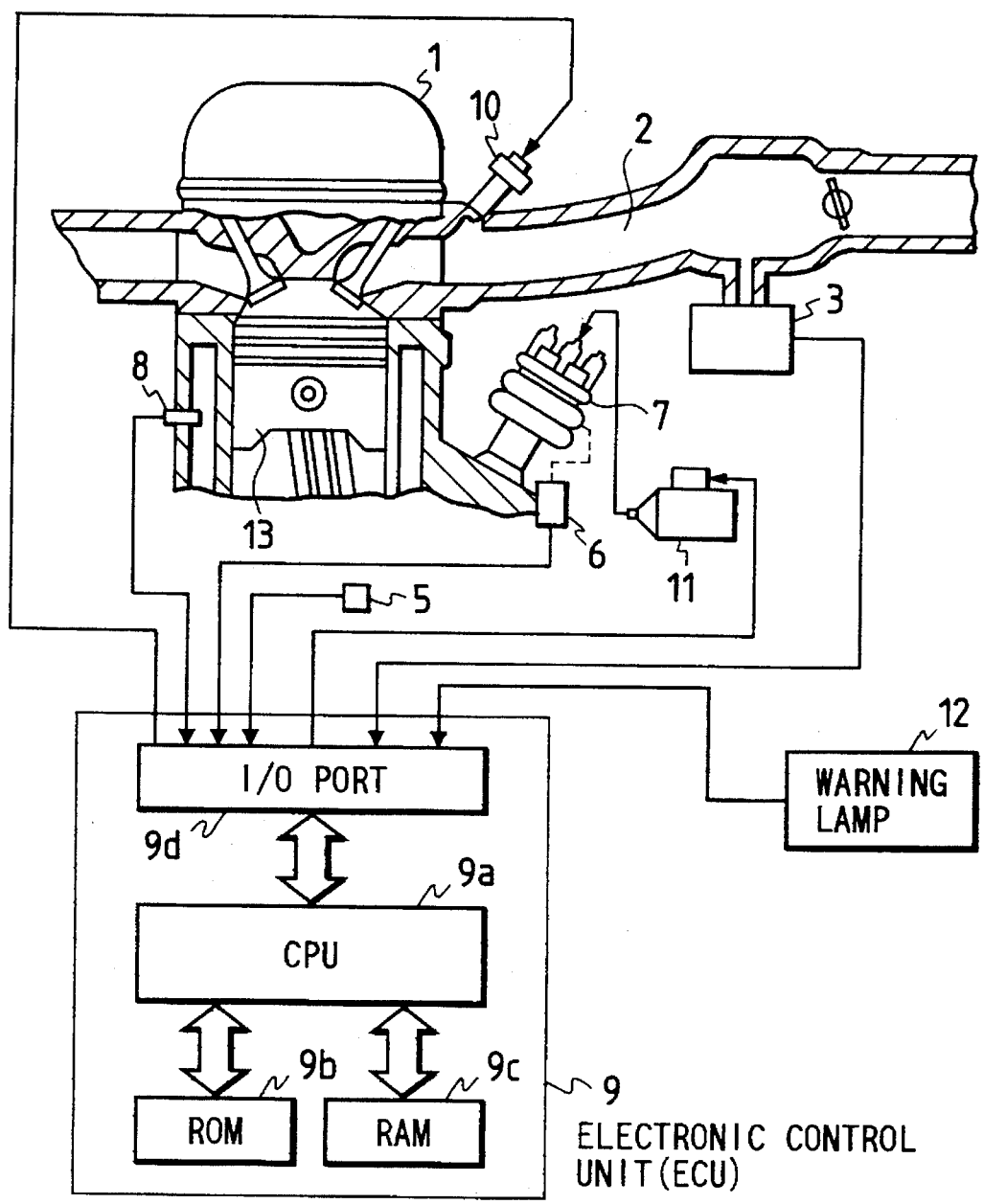
FIG. 1 is a diagram of an apparatus for detecting the occurrence of a misfire in an internal combustion engine according to a first embodiment of this invention.

With reference to FIG. 1, an internal combustion engine 1 has four cylinders, that is, first to fourth cylinders sequentially arranged in, for example, a line. It should be noted that FIG. 1 shows only one of the engine cylinders. An air passage 2 leading from an air cleaner (not shown) guides air to the engine cylinders. A pressure sensor 3 detects the pressure of air within a region of the air passage 2 downstream of an engine throttle valve (no reference numeral). The pressure sensor 3 is also referred to as the intake air pressure sensor 3. The pressure sensor 3 outputs a detection signal representative of the detected air pressure to an electronic control unit (ECU) 9.

A rotational angle sensor 5 is associated with the crankshaft or the camshaft of the engine 1. The rotational angle sensor 5 outputs an electric pulse at each of predetermined equally-spaced angles of the engine crankshaft or the engine camshaft. Accordingly, the rotational angle sensor 5 forms a rotation signal outputting means for generating a rotation signal used in determining the rotational speed Ne of the crankshaft of the engine 1. In some cases, the rotational speed Ne of the engine crankshaft is referred to as the rotational engine speed Ne or the engine speed Ne. The output signal of the rotational angle sensor 5 is fed to the ECU 9.

A reference angular position sensor 6 associated with the engine camshaft is disposed in a distributor 7 of an engine ignition system. The reference angular position sensor 6 generates a signal for discriminating the engine cylinders from each other. Specifically, the reference angular position sensor 6 outputs an electric pulse each time the piston 13 of the first cylinder reaches its top dead center (TDC). Generally, every electric pulse outputted from the reference angular position sensor 6 is synchronous with one of electric pulses outputted from the rotational angle sensor 5 during a period corresponding to a crank angle of 360 degrees or 720 degrees. The output signal of the reference angular position sensor 6 is fed to the ECU 9.

A coolant temperature sensor 8 disposed in a coolant passage in the body of the engine 1 detects the temperature of engine coolant. The coolant temperature sensor 8 outputs a signal representative of the detected coolant temperature to the ECU 9.

The ECU 9 determines suitable control amounts of the ignition system and a fuel supply system of the engine 1 in response to the output signals of the sensors 3, 5, 6, and 8, and other sensors (not shown). The ECU 9 generates control signals in accordance with the determined suitable control amounts of the ignition system and the fuel supply system, and outputs the control signals to an igniter 11 and fuel injectors 10.

The ECU 9 includes a microcomputer or a similar device. Specifically, the ECU 9 includes a CPU 9a, a ROM 9b, a RAM 9c, and an I/O port 9d. The CPU 9a is connected to the ROM 9b, the RAM 9c, and the I/O port 9d. The I/O port 9d is connected to the sensors 3, 5, 6, and 8. The I/O port 9d is also connected to the fuel injectors 10 and the igniter 11. The ECU 9 operates in accordance with a control program stored in the ROM 9b.

The CPU 9a executes calculations and data processing by referring to the control program. The ROM 9b stores the control program and also data of control constants (control coefficients) used in the calculations. The RAM 9c temporarily stores calculation data provided by the CPU 9a. The I/O 9d serves to accept the output signals of the sensors 3, 5, 6, and 8, and to output the control signals to the fuel injectors 10 and the igniter 11.

A warning lamp 12 is connected to the I/O port 9d within the ECU 9. In the case where the engine 1 is used as a vehicle-powering engine, the warning lamp 12 is preferably positioned on a vehicle instrument panel (not shown). As will be described later, the ECU 9 serves to detect the occurrence of serious misfiring conditions of the engine 1. When the ECU 9 detects the occurrence of serious misfiring conditions, the warning lamp 12 is activated by the ECU 9 to inform an operator or a vehicle driver of the occurrence of the serious misfiring conditions.

The rotational speed of the crankshaft of the engine 1 varies or fluctuates time to time. The amount of such a rotational speed variation is denoted by the character "$\Delta\omega$". The rotational speed variation amount $\Delta\omega$ corresponds to the second variation amount in the previously-indicated summary of the invention. The rotational speed variation amount $\Delta\omega$ depends on the occurrence of a misfire as described below.

Each of the cylinders of the engine 1 successively takes an intake stroke, a compression stroke, an expansion stroke (a power stroke), and an exhaust stroke, and periodically reiterates the sequence of the four strokes. It is now assumed that one engine cylinder misfires and another engine cylinder normally operates. In such a case, a mean rotational engine speed which occurs during an expansion stroke of the misfiring engine cylinder is remarkably different from a mean rotational engine speed which occurs during an expansion stroke of the normally operating engine cylinder. On the other hand, in cases where both two engine cylinders operate normally, a mean rotational engine speed which occurs during an expansion stroke of one of the two engine cylinders is substantially equal to a mean rotational engine speed which occurs during an expansion stroke of the other engine cylinder. Accordingly, a rotational speed variation amount $\Delta\omega$ is determined on the basis of the difference between such mean rotational engine speeds related to an engine cylinder in question and another engine cylinder The rotational speed variation amount $\Delta\omega$ depends on whether or not the engine cylinder in question misfires. Therefore, a rotational speed variation amount $\Delta\omega$ related to each engine cylinder is used in decision about misfiring conditions of the engine cylinder.

Figure 2A:
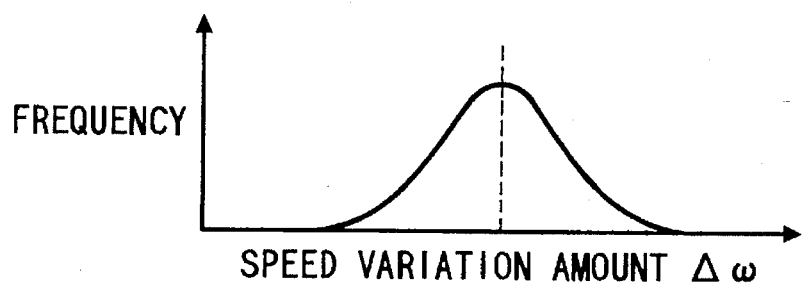
FIG. 2(a) is a diagram of an occurrence frequency distribution of rotational speed variation amounts related to a normally operating engine cylinder.
Figure 2B:
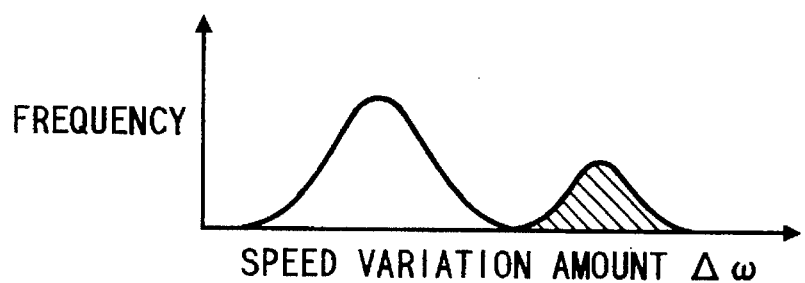
FIG. 2(b) is a diagram of an occurrence frequency distribution of rotational speed variation amounts related to an intermittently misfiring engine cylinder.
Figure 2C:
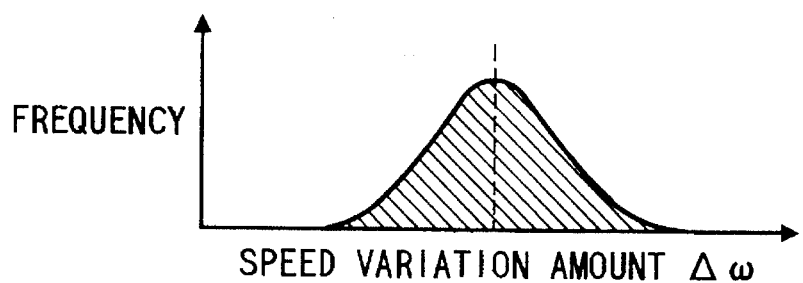
FIG. 2(c) is a diagram of an occurrence frequency distribution of rotational speed variation amounts related to a consecutively misfiring engine cylinder.

As shown in FIG. 2(a), when the engine 1 operates normally without misfiring, the occurrence frequencies of rotational speed variation amounts $\Delta\omega$ related to one of the engine cylinders have a normal distribution. As shown in FIG. 2(b), in cases where one of the cylinders of the engine 1 intermittently misfires at a given rate and the other cylinders operate normally during a plurality of successive engine operation cycles, the occurrence frequencies of rotational speed variation amounts $\Delta\omega$ related to the misfiring engine cylinder are in a distribution having two heaps or two peaks. As shown in FIG. 2(c), in cases where one of the cylinders of the engine 1 consecutively misfires and the other cylinders operate normally during a plurality of successive engine operation cycles, the occurrence frequencies of rotational speed variation amounts $\Delta\omega$ related to the misfiring cylinder have a normal distribution.

Figure 3A:
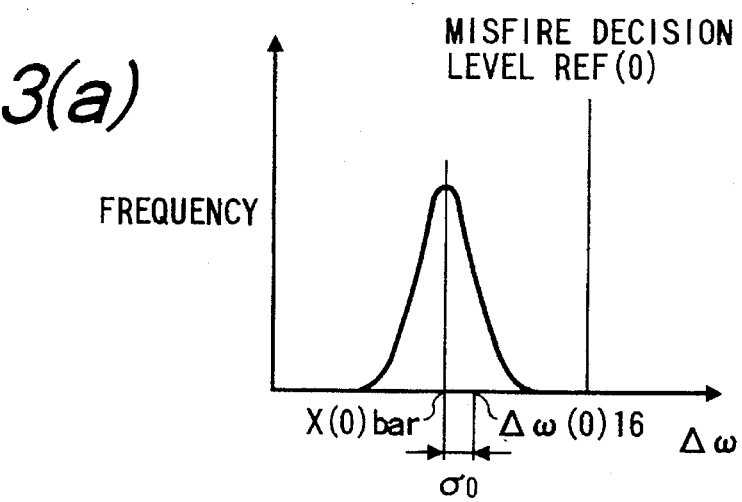
FIG. 3(a) is a diagram of an occurrence frequency distribution of rotational speed variation amounts related to a normally operating engine cylinder.
Figure 3B:
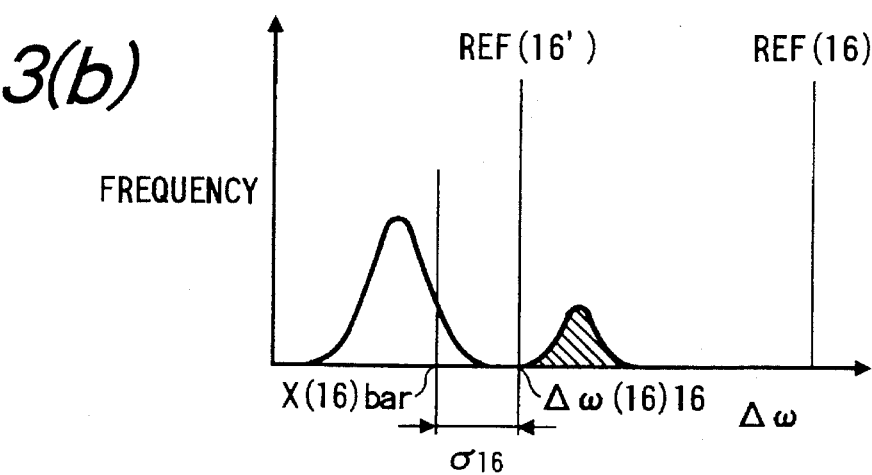
FIG. 3(b) is a diagram of an occurrence frequency distribution of rotational speed variation amounts related to an intermittently misfiring engine cylinder.

A description will now be given of a way of detecting the intermittent occurrence of misfires in one of the engine cylinders. FIG. 3(a) shows the occurrence frequencies of rotational speed variation amounts $\Delta\omega$ related to one of the engine cylinders which operates normally, that is, which operates at a misfire rate of 0%. FIG. 3(b) shows the occurrence frequencies of rotational speed variation amounts $\Delta\omega$ related to one of the engine cylinders which intermittently misfires at a rate of 16%, that is, which operates at a misfire rate of 16%. It should be noted that the misfire rate is equal to 100% when an engine cylinder misfires in every expansion stroke thereof.

In FIG. 3(a), "x(0)bar" denotes a cumulative 50% point at which the cumulation of the occurrence frequencies of higher (or lower) rotational speed variation amounts $\Delta\omega$ reaches 50%, and "$\Delta\omega(0)16$" denotes a cumulative 16% point at which the cumulation of the occurrence frequencies of higher rotational speed variation amounts $\Delta\omega$ reaches 16%. The value of the point $\Delta\omega(0)16$ is measured with respect to the point x(0)bar. In addition, "$\sigma o$" denotes the standard deviation of the occurrence frequency distribution. Since the occurrence frequency distribution is of the normal type, the value $\Delta\omega(0)16$ and the value $\sigma o$ are approximately equal to each other.

In FIG. 3(b), "x(16)bar" denotes a cumulative 50% point at which the cumulation of the occurrence frequencies of rotational speed variation amounts $\Delta\omega$ reaches 50%, and "$\Delta\omega(16)16$" denotes a cumulative 16% point at which the cumulation of the occurrence frequencies of higher rotational speed variation amounts $\Delta\omega$ reaches 16%. The value of the point $\Delta\omega(16)16$ is measured with respect to the point x(16)bar. In addition "σ16" denotes the standard deviation of the occurrence frequency distribution. The value $\Delta\omega(16)16$ and the value σ16 are approximately equal to each other.

As previously described, when the engine 1 operates normally without misfiring, the occurrence frequencies of rotational speed variation amounts $\Delta\omega$ related to one of the engine cylinders have a normal distribution. On the other hand, in cases where one of the cylinders of the engine 1 misfires at a given rate (intermittently misfires) and the other cylinders operate normally during a plurality of successive engine operation cycles, the occurrence frequencies of rotational speed variation amounts $\Delta\omega$ related to the misfiring engine cylinder are in a distribution having two heaps or two peaks. Therefore, the standard deviation of the occurrence frequency distribution which occurs during intermittently misfiring conditions is greater than the standard deviation of the occurrence frequency distribution which occurs during normal conditions. It should be noted that the standard deviation represents the degree of the dispersion of the occurrence frequency distribution. In addition, the cumulative 50% point which occurs during intermittently misfiring conditions is greater than the cumulative 50% point which occurs during normal conditions.

Thus, in FIGS. 3(a) and 3(b), the value of the point x(16)bar, that is, the value of the cumulative 50% point which occurs during the intermittently misfiring conditions, is greater than the value of the point x(0)bar related to the normal conditions. In addition, the values $\Delta\omega(16)16$ and σ16 related to the intermittently misfiring conditions are greater than the values $\Delta\omega(0)16$ and σo related to the normal conditions respectively.

As will be described later, regarding every expansion stroke of each engine cylinder, the occurrence of a misfire is detected by referring to a rotational speed variation amount $\Delta\omega$ and a misfire decision reference level. The misfire decision reference level is adjusted in accordance with the rate of the occurrence of misfires in preceding expansion strokes.

As previously described, the value $\Delta\omega(16)16$ related to the intermittently misfiring conditions with a misfire rate of 16% is greater than the value $\Delta\omega(0)16$ related to the normal conditions. The value of the point $\Delta\omega16$ at which the cumulation of the occurrence frequencies of higher rotational speed variation amounts $\Delta\omega$ reaches 16% is determined for each of the engine cylinders. The value of the point $\Delta\omega16$ related to an engine cylinder in question is compared with the value of the point $\Delta\omega16$ related to another engine cylinder. When the value of the point $\Delta\omega16$ related to the engine cylinder in question is greater than the value of the point $\Delta\omega16$ related to another engine cylinder, the engine cylinder in question is decided to be in intermittently misfiring conditions with a misfire rate of 16%. In such a case, the misfire decision reference level REF(16) for the engine cylinder in question is set as "REF(16)= x(16)bar+$\Delta\omega(16)16$". On the other hand, the misfire decision reference level REF for each of the other normally operating engine cylinders remains set as "REF=xbar+4σ". Thus, the misfire decision reference levels are automatically set in response to the misfire rates of the respective engine cylinders. This design enables sure detection of the occurrence of a misfire in every engine cylinder.

A description will now be given of a way of detecting the consecutive occurrence of misfires in one of the engine cylinders. As shown in FIG. 2(a), when the engine 1 operates normally without misfiring, the occurrence frequencies of rotational speed variation amounts $\Delta\omega$ related to one of the engine cylinders have a normal distribution. As shown in FIG. 2(c), in cases where one of the cylinders of the engine 1 consecutively misfires and the other cylinders operate normally during a plurality of successive engine operation cycles, the occurrence frequencies of rotational speed variation amounts $\Delta\omega$ related to the misfire cylinder have a normal distribution. Therefore, it is generally difficult to discriminate consecutively misfiring conditions from normal conditions by referring to the shape of the distribution of the occurrence frequencies of rotational speed variation amounts $\Delta\omega$.

A rotational speed variation amount $\Delta\omega$ related to consecutively misfiring conditions tends to be greater than a rotational speed variation amount $\Delta\omega$ related to normal conditions. Therefore, it is possible to discriminate a consecutively misfiring engine cylinder from normally operating engine cylinders by comparing rotational speed variation amounts $\Delta\omega$ of the respective engine cylinders with each other. However, at high engine speeds, the distribution of the occurrence frequencies of rotational speed variation amounts $\Delta\omega$ related to consecutively misfiring conditions overlaps the distribution of the occurrence frequencies of rotational speed variation amounts $\Delta\omega$ related to normal conditions, and it is therefore difficult to detect a consecutively misfiring engine cylinder. Such a problem is solved as follows. Rotational speed variation amounts $\Delta\omega$ are smoothed in time domain and the dispersion thereof is limited so that the distribution of the occurrence frequencies of rotational speed variation amounts $\Delta\omega$ related to consecutively misfiring conditions can be prevented from overlapping the distribution of the occurrence frequencies of rotational speed variation amounts $\Delta\omega$ related to normal conditions. Thus, even at high engine speeds, a misfire decision reference level can be provided between the distribution of the occurrence frequencies of rotational speed variation amounts $\Delta\omega$ related to consecutively misfiring conditions and the distribution of the occurrence frequencies of rotational speed variation amounts $\Delta\omega$ related to normal conditions, and accurate detection is enabled on the occurrence of consecutively misfiring conditions.

Figure 4:
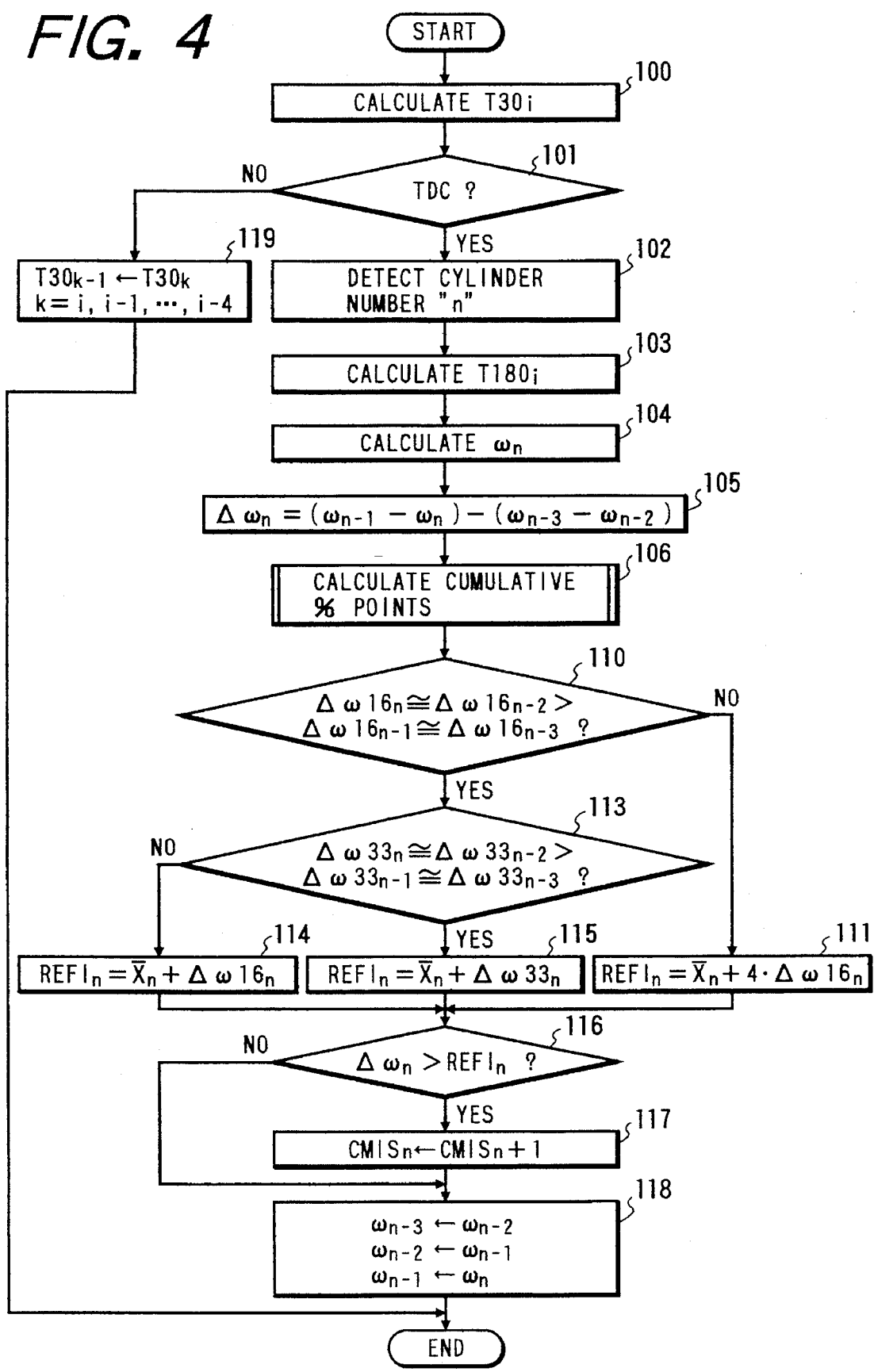
FIG. 4 is a flowchart of a segment of a control program for an ECU in FIG. 1 which is designed for detection of the occurrence of intermittent misfires.

The ECU 9 serves to detect the occurrence of intermittent misfires and the occurrence of consecutive misfires by using the previously-mentioned ways. As previously described, the ECU 9 operates in accordance with a control program stored in the internal ROM 9b. FIG. 4 is a flowchart of a segment of the control program which is designed for detection of the occurrence of intermittent misfires. The program segment of FIG. 4 is started by an interruption process each time the crankshaft of the engine 1 rotates by a predetermined angle, for example, 30 degrees (30° CA). In other words, the program segment of FIG. 4 is executed at every predetermined crankshaft rotational angle, for example, 30° CA The interruption process for starting the program segment of FIG. 4 is responsive to, for example, the output signal of the rotational angle sensor 5.

As shown in FIG. 4, a first step 100 of the program segment calculates the difference between the moment of the start of the immediately preceding execution cycle of the program segment and the moment of the start of the current execution cycle of the program segment, and thereby determines a time $T30_i$ spent in rotation of the engine crankshaft by a crank angle of 30 degrees (30° CA).

A step 101 following the step 100 decides whether or not the timing of the current interruption process corresponds to a top dead center (TDC, a compression top dead center or an exhaust top dead center) of one of the engine cylinders. The step 101 may decide whether or not an expansion stroke of one of the engine cylinders has just terminated. When the timing of the current interruption process corresponds to a top dead center (TDC) of one of the engine cylinders, or when an expansion stroke of one of the engine cylinder has just terminated, the program advances from the step 101 to a step 102. Otherwise, the program advances from the step 101 to a step 119. The step 101 is responsive to, for example, the output signals of the rotational angle sensor 5 and the reference angular position sensor 6. The step 102 and subsequent steps are periodically executed at every crankshaft rotational angle of 180 degrees (180° CA) which corresponds to the ignition period in the engine 1.

The step 102 detects a current cylinder discrimination number "n" representing one of the engine cylinders about which a process of detecting the occurrence of intermittent misfires will be executed in the current execution cycle of the program segment. Specifically, the numerals "1", "2", "3", and "4" are previously assigned to the engine cylinders as different cylinder discrimination numbers respectively. The current cylinder discrimination number "n" is periodically updated among these numerals. The updating of the current cylinder discrimination number "n" is accorded with the ignition sequence of the engine cylinders. In the case where the ignition sequence of the engine cylinders is as "first cylinder→third cylinder→fourth cylinder→second cylinder", when "n" denotes the first cylinder, "n+1" denotes the third cylinder and "n−1" denotes the second cylinder. In some of other steps of the program segment, the cylinder discrimination number "n" is used as suffixes of variables. The suffixes mean that the related variables are assigned to the engine cylinder denoted by the corresponding cylinder discrimination number.

A step 103 following the step 102 sums up the current time $T30_i$ and the five preceding times $T30_{i-1}$, $T30_{i-2}$, $T30_{i-3}$, $T30_{i-4}$, and $T30_{i-5}$ to calculate a time $T180_i$ spent in rotation of the engine crankshaft by a crank angle of 180 degrees (180° CA). In the case of a six-cylinder engine, the step 103 is modified so as to sum up the current time. $T30_i$ and the three preceding times $T30_{i-1}$, $T30_{i-2}$, and $T30_{i-3}$ to calculate a time $T120_i$ spent in rotation of the engine crankshaft by a crank angle of 120 degrees (120° CA).

A step 104 following the step 103 calculates a mean rotational engine speed (an average rotational engine speed) $\omega_n$ which occurs during a 180°-CA interval corresponding to an expansion stroke of the "n" engine cylinder. Specifically, the step 104 calculates the reciprocal of the time $T180_i$, and determines the mean rotational engine speed $\omega_n$ on the basis of the calculated reciprocal.

A step 105 following the step 104 calculates a rotational speed variation amount $\Delta\omega_n$ (a rotational speed variation amount $\Delta\omega$) by referring to the following equation.

$$\Delta\omega_n=(\omega_{n-1}-\omega_n)-(\omega_{n-3}-\omega_{n-2}) \quad (1)$$

In the case of a six-cylinder engine, the step 105 is modified so as to calculate a rotational speed variation amount $\Delta\omega_n$ (a rotational speed variation amount $\Delta\omega$) by referring to the following equation.

$$\Delta\omega_n=(\omega_{n-1}-\omega_n)-(\omega_{n-4}-\omega_{n-3}) \quad (2)$$

In the equations (1) and (2): "$\omega_n$" denotes the mean rotational engine speed calculated by the step 104 during the current execution of the step 104 and related to the "n" engine cylinder (the engine cylinder identified by the cylinder discrimination number "n"); "$\omega_{n-1}$" denotes the mean rotational engine speed calculated by the step 104 during the first immediately preceding execution of the step 104 and related to the "n−1" engine cylinder (the engine cylinder identified by the cylinder discrimination number "n−1"); "$\omega_{n-2}$" denotes the mean rotational engine speed calculated by the step 104 during the second immediately preceding execution of the step 104 and related to the "n−2" engine cylinder (the engine cylinder identified by the cylinder discrimination number "n−2"); "$\omega_{n-3}$" denotes the mean rotational engine speed calculated by the step 104 during the third immediately preceding execution of the step 104 and related to the "n−3" engine cylinder (the engine cylinder identified by the cylinder discrimination number "n−3"); and "$\omega_{n-4}$" denotes the mean rotational engine speed calculated by the step 104 during the fourth immediately preceding execution of the step 104 and related to the "n−4" engine cylinder (the engine cylinder identified by the cylinder discrimination number "n−4"). In addition, "$(\omega_{n-1}-\omega_n)$" denotes a variation amount, referred to as the first variation amount in the previously-indicated summary of the invention, between two successive engine cylinders in the ignition sequence. Also, "$(\omega_{n-3}-\omega_{n-2})$" and "$(\omega_{n-4}-\omega_{n-3})$" denote similar variation amounts.

A block 106 following the step 105 calculates cumulative percentage points (cumulative 16%, 33%, and 50% points) in the frequency distribution of the current and previous rotational speed variation amounts $\Delta\omega_n$ for the "n" engine cylinder. The cumulative 16% point agrees with a point at which the cumulation of the occurrence frequencies of higher rotational speed variation amounts $\Delta\omega_n$ reaches 16%. The cumulative 33% point agrees with a point at which the cumulation of the occurrence frequencies of higher rotational speed variation amounts $\Delta\omega_n$ reaches 33%. The cumulative 50% point agrees with a point at which the cumulation of the occurrence frequencies of higher (or lower) rotational speed variation amounts $\Delta\omega_n$ reaches 50%. The block 106 will be described in more detail later.

A step 110 following the block 106 compares the values of the cumulative 16% points $\Delta\omega 16_n$, $\Delta\omega 16_{n-1}$, $\Delta\omega 16_{n-2}$, and $\Delta\omega 16_{n-3}$ given by the block 106. Specifically, the step 110 decides whether or not the values of the cumulative 16% points $\Delta\omega 16_n$, $\Delta\omega 16_{n-1}$, $\Delta\omega 16_{n-2}$, and $\Delta\omega 16_{n-3}$ satisfy conditions given as follows.

$$\Delta\omega 16_n \cong \Delta\omega 16_{n-2} > \Delta\omega 16_{n-1} \cong \Delta\omega 16_{n-3} \quad (3)$$

Figure 3C:
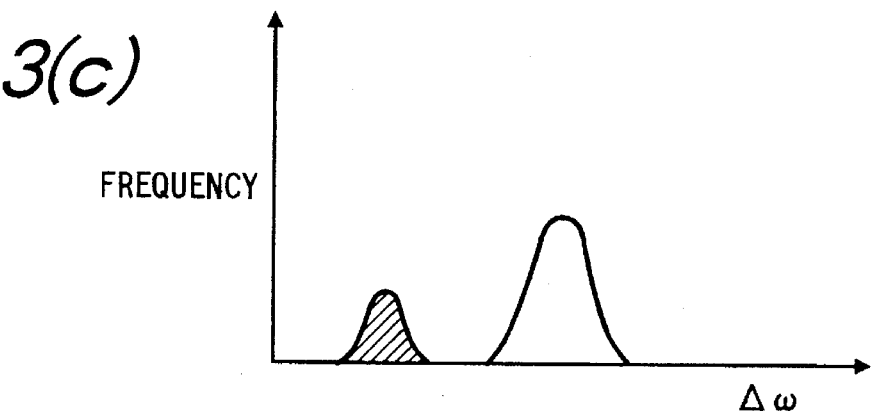
FIG. 3(c) is a diagram of an occurrence frequency distribution of rotational speed variation amounts related to a normally operating engine cylinder and affected by intermittent misfires in another engine cylinder.

The conditions (3) mean that the values of the cumulative 16% points $\Delta\omega 16_n$ and $\Delta\omega 16_{n-2}$ are approximately equal; the values of the cumulative 16% points $\Delta\omega 16_{n-1}$ and $\Delta\omega 16_{n-3}$ are approximately equal; and the value of the cumulative 16% point $\Delta\omega 16_{n-2}$ is appreciably greater than the value of the cumulative 16% point $\Delta\omega 16_{n-1}$. When the conditions (3) are satisfied, the "n" engine cylinder is decided to be in a misfiring state with a misfire rate of 16% or more. In this case, the program advances from the step 110 to a step 113. It should be noted that when the "n" engine cylinder is in a misfiring state, the occurrence frequencies of rotational speed variation amounts $\Delta\omega$ related to the "n−2" engine cylinder are caused by the misfiring state of the "n" engine cylinder to exhibit a greatly-dispersed distribution such as shown in FIG. 3(c). When the conditions (3) are not satisfied, the "n" engine cylinder is decided to be normally operating. In this case, the program advances from the step 110 to a step 111.

The step 111 sets a misfire decision reference level $REFI_n$ for the "n" engine cylinder by referring to the following equation.

$$REFI_n = \bar{X}_n + 4 \cdot \Delta\omega 16_n \qquad (4)$$

where "$\bar{X}_n$" denotes the value of the cumulative 50% point given by the block 106 and related to the "n" engine cylinder. The cumulative 50% point value $\bar{X}$ will be denoted by the character "Xbar" hereinafter. The value Xbar is used as a reference value for generating a misfire decision reference value (a misfire decision reference level). The term "$\Delta\omega 16_n$" in the equation (4) corresponds to the standard deviation "$\sigma$" of the occurrence frequency distribution of the rotational speed variation amounts $\Delta\omega$. According to the equation (4), the misfire decision reference level is set equal to "Xbar+4$\sigma$". After the step 111, the program advances to a step 116.

The step 113 compares the values of the cumulative 33% points $\Delta\omega 33_n$, $\Delta\omega 33_{n-1}$, $\Delta\omega 33_{n-2}$, and $\Delta\omega 33_{n-3}$ given by the block 106. Specifically, the step 113 decides whether or not the values of the cumulative 33% points $\Delta\omega 33_n$, $\Delta\omega 33_{n-1}$, $\Delta\omega 33_{n-2}$, and $\Delta\omega 33_{n-3}$ satisfy conditions given as follows.

$$\Delta\omega 33_n \cong \Delta\omega 33_{n-2} > \Delta\omega 33_{n-1} \cong \Delta\omega 33_{n-3} \qquad (5)$$

The conditions (5) mean that the values of the cumulative 33% points $\Delta\omega 33_n$ and $\Delta\omega 33_{n-2}$ are approximately equal; the values of the cumulative 33% points $\Delta\omega 33_{n-1}$ and $\Delta\omega 33_{n-3}$ are approximately equal; and the value of the cumulative 33% point $\Delta\omega 33_{n-2}$ is appreciably greater than the value of the cumulative 33% point $\Delta\omega 33_{n-1}$. When the conditions (5) are satisfied, the "n" engine cylinder is decided to be in a misfiring state with a misfire rate of 33% or more. In this case, the program advances from the step 113 to a step 115. When the conditions (5) are not satisfied, the "n" engine cylinder is decided to be in a misfiring state with a misfire rate between 16% and 33%. In this case, the program advances from the step 113 to a step 114.

The step 114 sets the misfire decision reference level $REFI_n$ for the "n" engine cylinder by referring to the following equation.

$$REFI_n = Xbar_n + \Delta\omega 16_n \qquad (6)$$

After the step 114, the program advances to the step 116.

The step 115 sets the misfire decision reference level $REFI_n$ for the "n" engine cylinder by referring to the following equation.

$$REFI_n = Xbar_n + \Delta\omega 33_n \qquad (7)$$

After the step 115, the program advances to the step 116.

The step 116 compares the rotational speed variation amount $\Delta\omega_n$ given by the step 105 and the misfire decision reference level $REFI_n$ given by one of the steps 111, 114, and 115. When the rotational speed variation amount $\Delta\omega_n$ is greater than the misfire decision reference level $REFI_n$, it is decided that the "n" engine cylinder misfires in the last expansion stroke. In this case, the program advances from the step 116 to a step 117. When the rotational speed variation amount $\Delta\omega_n$ is not greater than the misfire decision reference level $REFI_n$, it is decided that the "n" engine cylinder does not misfire in the last expansion stroke. In this case, the program jumps from the step 116 to a step 118.

The step 117 increments a tentative misfire counter $CMIS_n$ for the "n" engine cylinder by "1" according to the statement as "$CMIS_n = CMIS_n + 1$". It should be noted that the tentative misfire counter $CMIS_n$ is a variable used as a counter. The tentative misfire counter CMIS is prodded for each of the engine cylinders so that four tentative misfire counters are present since the engine 1 has four cylinders. The tentative misfire counter $CMIS_n$ is used in counting the number of times of decision that $\Delta\omega_n > REFI_n$ holds in the above-indicated misfire detecting process made for the "n" engine cylinder. The result of this counting is stored into the RAM 9c. After the step 117, the program advances to the step 118.

The step 118 updates the current cylinder discrimination number "n". In addition, the step 118 updates the values represented by the variables $\omega_{n-1}$, $\omega_{n-2}$, and $\omega_{n-3}$. Specifically, the value of the variable $\omega_{n-1}$ is set equal to the current mean rotational engine speed $\omega_n$. The value of the variable $\omega_{n-2}$ is set equal to the first immediately preceding mean rotational engine speed $\omega_{n-1}$. The value of the variable $\omega_{n-3}$ is set equal to the second immediately preceding mean rotational engine speed $\omega_{n-2}$. After the step 118, the current execution cycle of the program segment ends. In the case of a six-cylinder engine, the step 118 is modified so that the value of the variable $\omega_{n-4}$ will be set equal to the third immediately preceding mean rotational engine speed $\omega_{n-3}$.

The step 119 updates the values represented by the variables $T30_{i-1}$, $T30_{i-2}$, $T30_{i-3}$, $T30_{i-4}$, and $T30_{i-5}$. Specifically, the value of the variable $T30_{i-1}$ is set equal to the current time $T30_i$. The value of the variable $T30_{i-2}$ is set equal to the first immediately preceding time $T30_{i-1}$. The value of the variable $T30_{i-3}$ is set equal to the second immediately preceding preceding time $T30_{i-2}$. The value of the variable $T30_{i-4}$ is set equal to the third immediately preceding preceding time $T30_{i-3}$. The value of the variable $T30_{i-5}$ is set equal to the fourth immediately preceding preceding time $T30_{i-4}$. After the step 119, the current execution cycle of the program segment ends.

Figure 5:
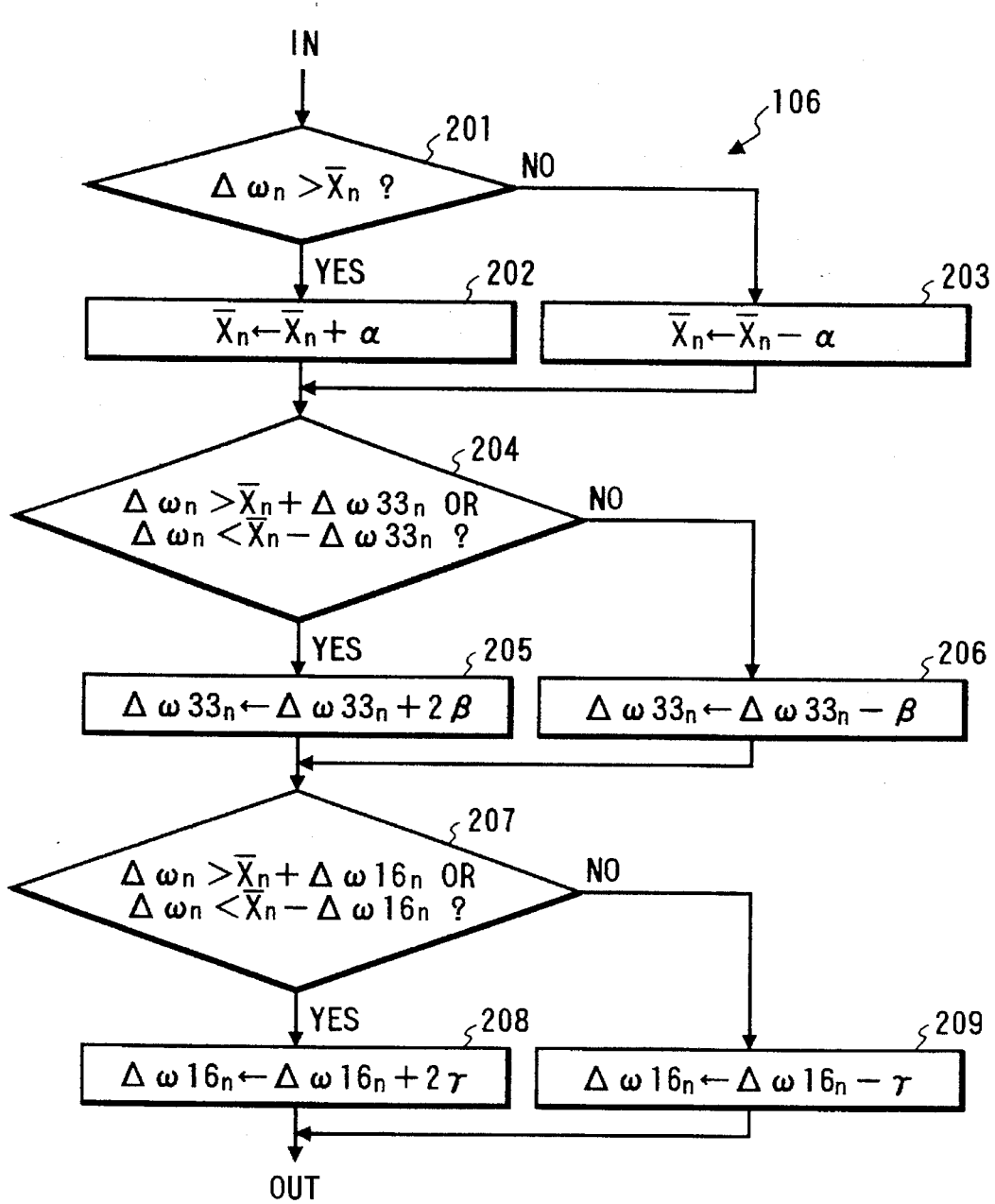
FIG. 5 is a flowchart of the details of a block in FIG. 4.

FIG. 5 shows the details of the block 106 for the calculation of the cumulative percentage points. The block 106 is periodically executed at every crankshaft rotational angle of 180 degrees (180° CA) which corresponds to the ignition period in the engine 1.

As shown in FIG. 5, a first step 201 of the block 106 which follows the step 105 of FIG. 4 reads out data of a value $Xbar_n$ from the RAM 9c. The value $Xbar_n$ is used for determining a cumulative 50% point in the occurrence frequency distribution. The step 201 compares the current rotational speed variation amount $\Delta\omega_n$ and the value $Xbar_n$. When the current rotational speed variation amount $\Delta\omega_n$ is greater than the value $Xbar_n$, the program advances from the step 201 to a step 202. Otherwise, the program advances from the step 201 to a step 203.

The step 202 updates the value $Xbar_n$, and specifically increments the value $Xbar_n$ by a given value "$\alpha$" according to the statement as "$Xbar_n = Xbar_n + \alpha$". After the step 202, the program advances to a step 204.

The step 203 updates the value $Xbar_n$, and specifically decrements the value $Xbar_n$ by the given value "$\alpha$" according to the statement as "$Xbar_n = Xbar_n - \alpha$". After the step 203, the program advances to the step 204.

As a result of the execution of the steps 202 and 203, the latest value $Xbar_n$ is made approximately equal to the value of a cumulative 50% point in the distribution of the occurrence frequencies of the rotational speed variation amounts $\Delta\omega_n$ related to the "n" engine cylinder.

The step 204 compares the current rotational speed variation amount $\Delta\omega_n$ with a value "$Xbar_n + \Delta\omega 33_n$" and a value "$Xbar_n - \Delta\omega 33_n$". The value "$Xbar_n + \Delta\omega 33_n$" is used for determining a cumulative 33% point in the distribution. When the current rotational speed variation amount $\Delta\omega_n$ is greater than the value "$Xbar_n + \Delta\omega 33_n$" or is smaller than the value "$Xbar_n - \Delta\omega 33_n$", the program advances from the step 204 to a step 205. When the current rotational speed variation amount $\Delta\omega_n$ is between the value "$Xbar_n - \Delta\omega 33_n$"

and the value "Xbar$_n$+Δω33$_n$,", the program advances from the step 204 to a step 206.

The step 205 updates the value Δω33$_n$, and specifically increments the value Δω33$_n$ by twice a given value "β" according to the statement as "Δω33$_n$=Δω33$_n$+2·β". After the step 205, the program advances to a step 207.

The step 206 updates the value Δω33$_n$, and specifically decrements the value Δω33$_n$ by the given value "β" according to the statement as "Δω33$_n$=Δω33$_n$−β". After the step 206, the program advances to the step 207.

As a result of the execution of the steps 205 and 206, the latest value "Xbar$_n$+Δω33$_n$" is made approximately equal to the value of a cumulative 33% point in the distribution of the occurrence frequencies of the rotational speed variation amounts Δω$_n$ related to the "n" engine cylinder. Therefore, the value Δω33$_n$ agrees with the value of the cumulative 33% point relative to the point Xbar$_n$.

The step 207 compares the current rotational speed variation amount Δω$_n$ with a value "Xbar$_n$+Δω16$_n$," and a value "Xbar$_n$−Δω16$_n$,". The value "Xbar$_n$+Δω16$_n$" is used for determining a cumulative 16% point in the distribution. When the current rotational speed variation amount Δω$_n$ is greater than the value "Xbar$_n$+Δω16$_n$," or is smaller than the value "Xbar$_n$−AΔω16$_n$,", the program advances from the step 207 to a step 208. When the current rotational speed variation amount Δω$_n$ is between the value "Xbar$_n$−Δω16$_n$" and the value "Xbar$_n$+Δω16$_n$,", the program advances from the step 207 to a step 209.

The step 208 updates the value Δω16$_n$, and specifically increments the value Δω16$_n$ by twice a given value "γ" according to the statement as Δω16$_n$=Δω16$_n$+2·γ". After the step 208, the program advances to the step 110 of FIG. 4.

The step 209 updates the value Δω16$_n$, and specifically decrements the value Δω16$_n$ by the given value "γ" according to the statement as "Δω16$_n$=Δω16$_n$−γ". After the step 209, the program advances to the step 110 of FIG. 4.

As a result of the execution of the steps 208 and 209, the latest value "Xbar$_n$+Δω16$_n$" is made approximately equal to the value of a cumulative 16% point in the distribution of the occurrence frequencies of the rotational speed variation amounts Δω$_n$ related to the "n" engine cylinder. Therefore, the value Δω16$_n$ agrees with the value of the cumulative 33% point relative to the point Xbar$_n$.

Figure 6:
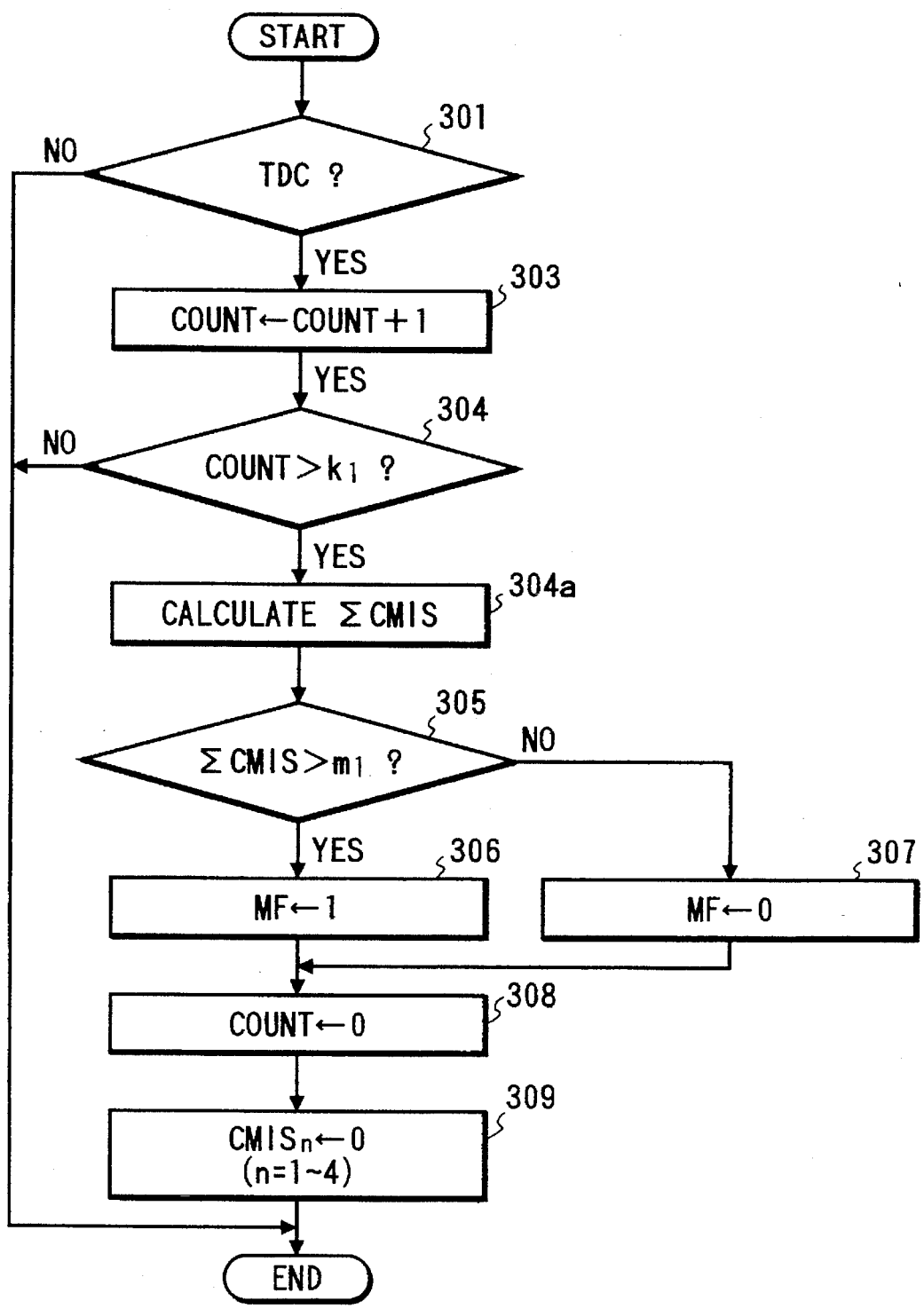
FIG. 6 is a flowchart of a segment of the control program for the ECU in FIG. 1 which is designed for detection of the occurrence of serious misfiring conditions.

FIG. 6 is a flowchart of a segment of the control program which is designed for detection of the occurrence of serious misfires (or misfires which call for treatment). The program segment of FIG. 6 is started by an interruption process each time the crankshaft of the engine 1 rotates by a predetermined angle, for example, 30 degrees (30° CA). In other words, the program segment of FIG. 6 is executed at every predetermined crankshaft rotational angle, for example, 30° CA The interruption process for starting the program segment of FIG. 6 is responsive to, for example, the output signal of the rotational angle sensor 5.

As shown in FIG. 6, a first step 301 of the program segment decides whether or not the timing of the current interruption process corresponds to a top dead center (TDC, a compression top dead center or an exhaust top dead center) of one of the engine cylinders. When the timing of the current interruption process corresponds to a top dead center (TDC) of one of the engine cylinders, the program advances from the step 301 to a step 303. Otherwise, the program exits from the step 301, and the current execution cycle of the program segment ends. The step 303 and subsequent steps are periodically executed at every crankshaft rotational angle of 180 degrees (180° CA) which corresponds to the ignition period in the engine 1.

The step 303 increments a decision counter COUNT by "1" according to the statement as "COUNT=COUNT+1". It should be noted that the decision counter COUNT is a variable used as a counter. The decision counter COUNT is used in counting the number of times of ignition in the engine 1.

A step 304 following the step 303 compares the value of the decision counter COUNT with a given value k1. When the value of the decision counter COUNT is greater than the given value k1, the program advances from the step 304 to a step 304a. Otherwise, the program exits from the step 304, and the current execution cycle of the program segment ends.

The step 304a calculates the sum ΣCMIS of the values of the tentative misfire counters CMIS of the respective engine cylinders which are given by the step 117 of FIG. 4 and a later-indicated step 402-2 of FIG. 7. The tentative misfire counters CMIS of the respective engine cylinders are denoted by CMIS$_1$, CMIS$_2$, CMIS$_3$, and CMIS$_4$ respectively.

A step 305 following the step 304a compares the sum ΣCMIS with a given value m1. When the sum ΣCMIS is greater than the given value m1, it is decided that the engine 1 seriously misfires. In this case, the program advances from the step 305 to a step 306 which sets a misfire flag MF to "1". When the sum ΣCMIS is smaller than or equal to the given value m1, it is decided that the engine 1 does not seriously misfires. In this case, the program advances from the step 305 to a step 307 which sets the misfire flag MF to "0".

After the steps 306 and 307, the program advances to a step 308 which clears or resets the decision counter COUNT to "0". A step 309 following the step 308 clears or resets the tentative misfire counters CMIS (CMIS$_1$, CMIS$_2$, CMIS$_3$, and CMIS$_4$) of the respective engine cylinders to "0". After the step 309, the current execution cycle of the program segment ends.

It is preferable that the ECU 9 executes a process of activating the warning lamp 12 when the misfire flag MF is "1". It is also preferable that the ECU 9 executes a fail-safe process when the misfire flag MF is "1".

In some cases, the engine 1 is decided to be in serious misfiring conditions even when only one of the engine cylinders misfires. It is preferable that a decision is made as to whether or not each of the engine cylinders misfires, and data of the cylinder discrimination number or numbers corresponding to the misfiring engine cylinder or cylinders are stored in the memory within the ECU 9.

Figure 7:
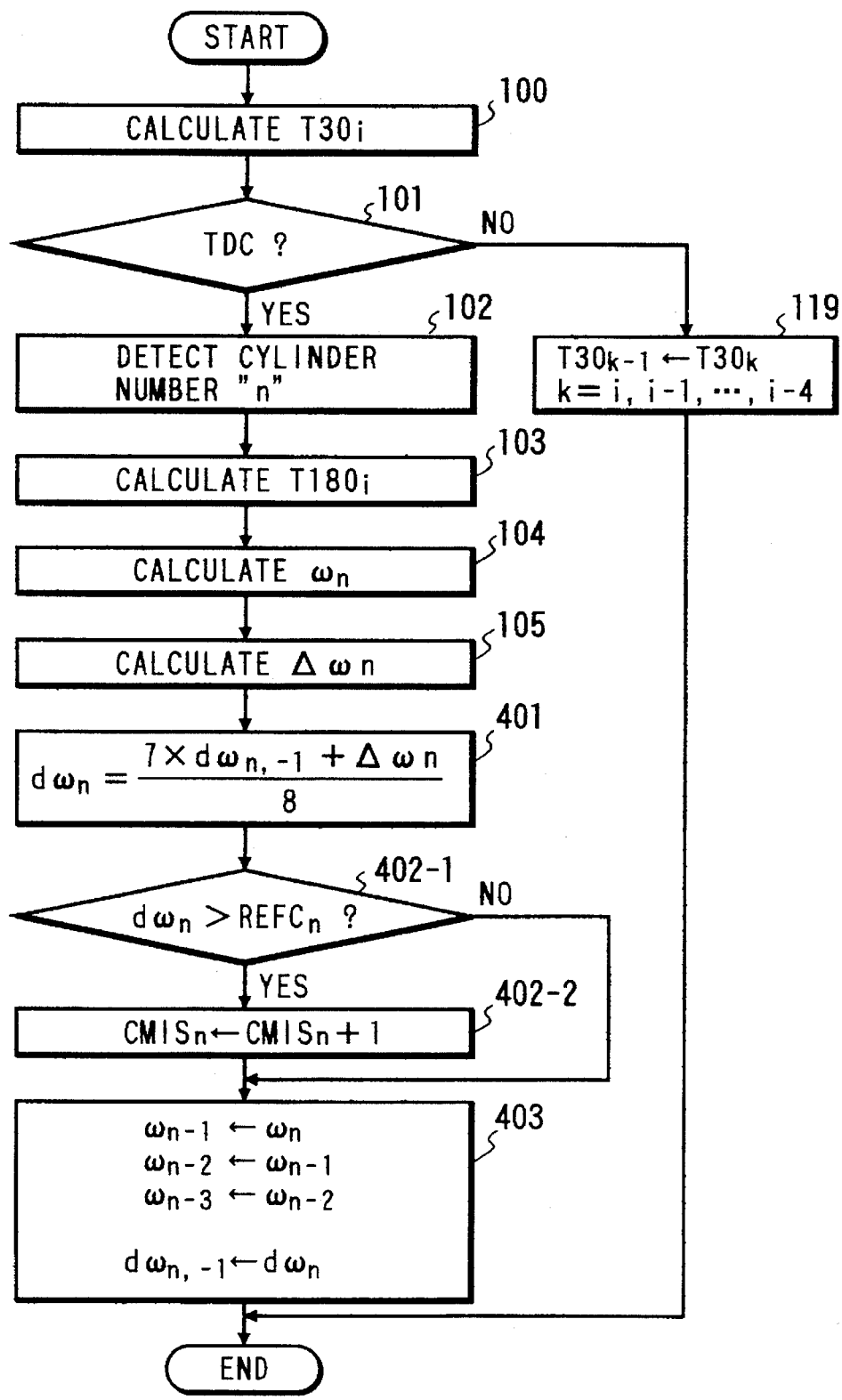
FIG. 7 is a flowchart of a segment of the control program for the ECU in FIG. 1 which is designed for detection of the occurrence of consecutive misfires.

FIG. 7 is a flowchart of a segment of the control program which is designed for detection of the occurrence of consecutive misfires. The program segment of FIG. 7 is started by an interruption process each time the crankshaft of the engine 1 rotates by a predetermined angle, for example, 30 degrees (30° CA). In other words, the program segment of FIG. 7 is executed at every predetermined crankshaft rotational angle, for example, 30° CA The interruption process for starting the program segment of FIG. 7 is responsive to, for example, the output signal of the rotational angle sensor 5.

The program segment of FIG. 7 has steps 100, 101, 102, 103, 104, 105, and 119 similar to the steps 100, 101, 102, 103, 104, 105, and 119 of FIG. 4. A detailed description of the steps 100, 101, 102, 103, 104, 105, and 119 in FIG. 7 will be omitted.

In the program segment of FIG. 7, the step 105 is followed by a step 401. The step 401 calculates a mean rotational speed variation dω$_n$ for the "n" engine cylinder by referring to the equation as follows.

$$d\omega_n = \{(K-1) \cdot d\omega_{n,-1} + \Delta\omega_n\}/K \quad (8)$$

where "$d\omega_{n,-1}$" denotes the immediately preceding mean rotational speed variation for the "n" engine cylinder, and "K" denotes a predetermined constant equal to, for example, 8. Thus, the rotational speed variation amount $\omega_n$ is smoothed or integrated in a time base into the mean rotational speed variation $d\omega_n$.

Figure 8A:
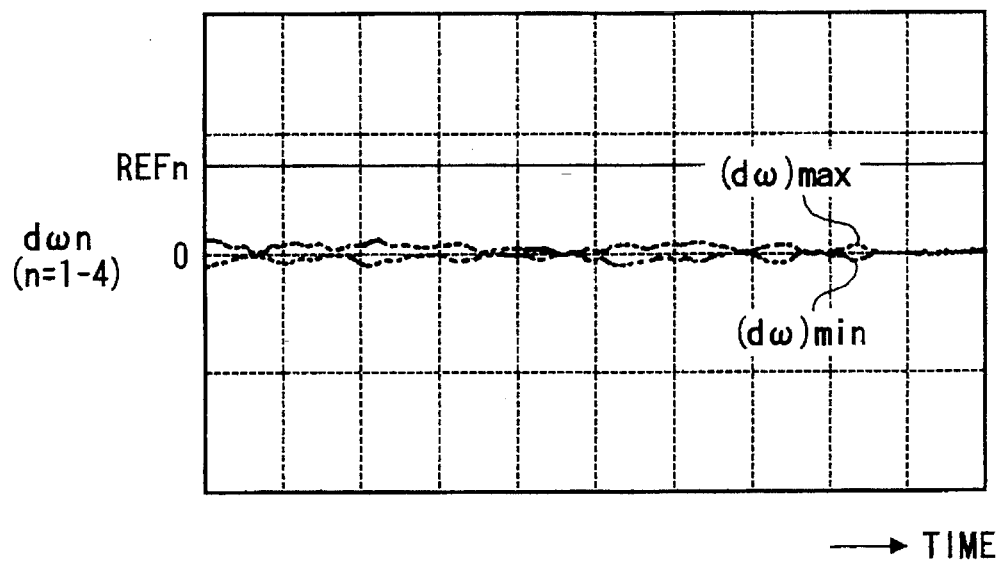
FIG. 8(a) is a time-domain diagram of an example of time-domain variations in a mean rotational speed variation values $d\omega_n$ which occur when all engine cylinders operate normally.
Figure 8B:
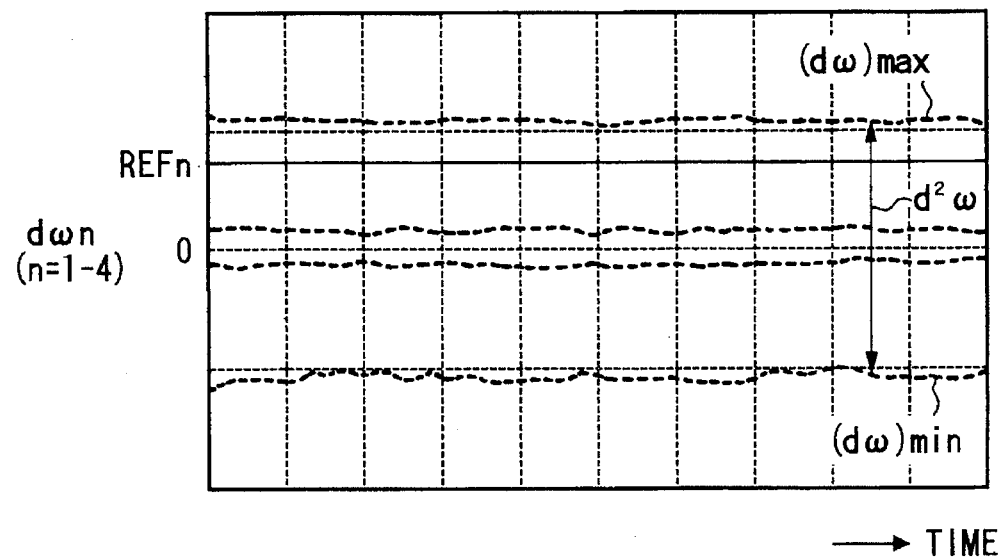
FIG. 8(b) is a time-domain diagram of an example of time-domain variations in mean rotational speed variation values $d\omega_n$ which occur when a certain engine cylinder consecutively misfires and other engine cylinders operate normally.

FIG. 8(a) shows an example of time-domain variations in the mean rotational speed variation values $d\omega_n$ which occur when all the engine cylinders operate normally. FIG. 8(b) shows an example of time-domain variations in the mean rotational speed variation values $d\omega_n$ which occur when a certain engine cylinder consecutively misfires and the other engine cylinders operate normally. As understood from FIG. 8(b), it is possible to discriminate the mean rotational speed variation value $d\omega_n$ related to the normally operating engine cylinder and the mean rotational speed variation value $d\omega_n$ related to the consecutively misfiring engine cylinder.

A step 402-1 following the step 401 compares the mean rotational speed variation value $d\omega_n$ given by the step 401 with a given misfire decision reference level $REFC_n$. When the mean rotational speed variation value $d\omega_n$ is greater than the given misfire decision reference level $REFC_n$, it is decided that the "n" engine cylinder misfires. In this case, the program advances from the step 402-1 to a step 402-2. When the mean rotational speed variation value $d\omega_n$ is not greater than the given misfire decision reference level $REFC_n$, it is decided that the "n" engine cylinder does not misfire. In this case, the program jumps from the step 402-1 to a step 403.

The step 402-2 increments the tentative misfire counter $CMIS_n$ for the "n" engine cylinder by "1" according to the statement as "$CMIS_n = CMIS_n + 1$". The tentative misfire counter $CMIS_n$ is used by the step 304a of FIG. 6. After the step 402-2, the program advances to the step 403.

The step 403 updates the current cylinder discrimination number "n". In addition, the step 403 updates the values represented by the variables $\omega_{n-1}$, $\omega_{n-2}$, and $\omega_{n-3}$. Specifically, the value of the variable $\omega_{n-1}$ is set equal to the current mean rotational engine speed $\omega_n$. The value of the variable $\omega_{n-2}$ is set equal to the first immediately preceding mean rotational engine speed $\omega_{n-1}$. The third immediately preceding mean rotational engine speed $\omega_{n-3}$ is set equal to the second immediately preceding mean rotational engine speed $\omega_{n-2}$. Furthermore, the step 403 updates the value represented by the variable $d\omega_{n,-1}$. Specifically, the value of the variable $d\omega_{n,-1}$ is set equal to the current mean rotational speed variation $d\omega_n$. After the step 403, the current execution cycle of the program segment ends.

Figure 9:
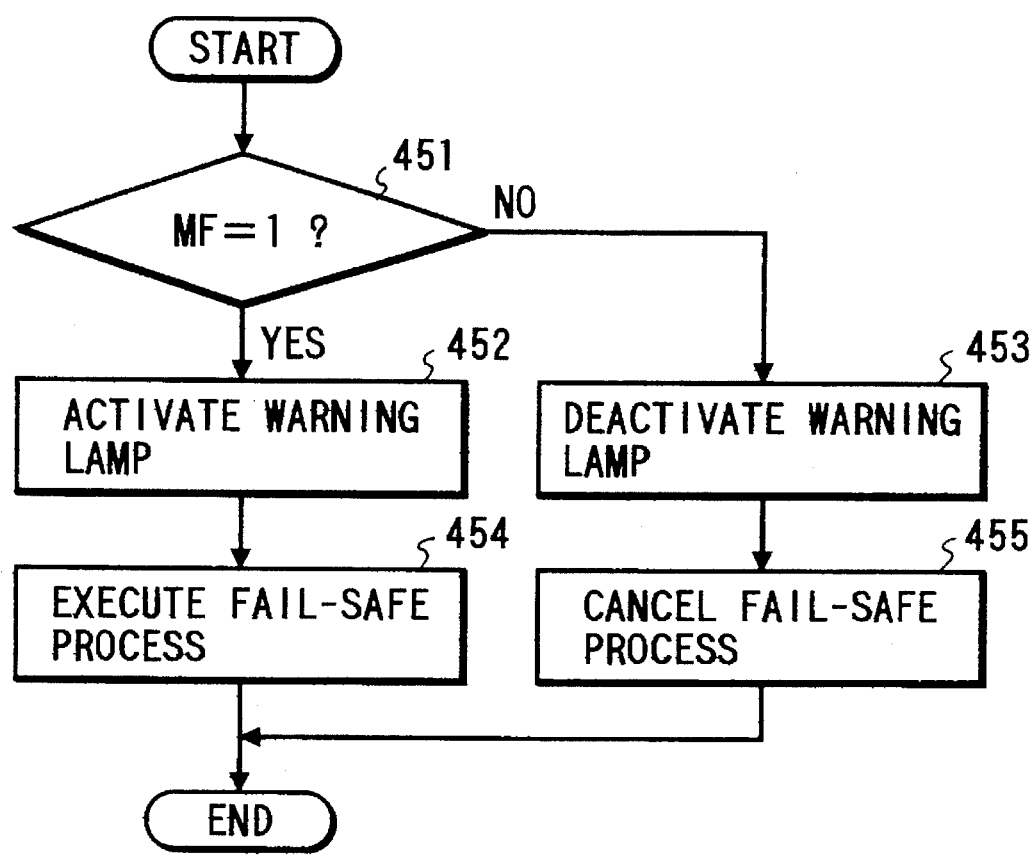
FIG. 9 is a flowchart of a segment of the control program for the ECU in FIG. 1 which is designed for a warning process.

FIG. 9 is a flowchart of a segment of the control program which is designed for a warning process. The program segment of FIG. 9 is started by an interruption process each time a given time elapses. In other words, the program segment of FIG. 9 is reiterated at a given period of time.

As shown in FIG. 9, a first step 451 of the program segment decides whether or not the misfire flag MF is "1". When the misfire flag MF is "1", that is, when the engine 1 seriously misfires, the program advances from the step 451 to a step 452. When the misfire flag MF is not "1", that is, when the engine 1 does not seriously misfires, the program advances from the step 451 to a step 453.

The step 452 activates the warning lamp 12. A step 454 following the step 452 executes a fail-safe process which includes, for example, a step of cutting off the supply of fuel to an misfiring engine cylinder or cylinders to protect a catalytic converter in an engine exhaust system and to prevent air pollution. After the step 454, the current execution cycle of the program segment ends.

The step 453 deactivates the warning lamp 12 if it is active. A step 455 following the step 453 cancels the fail-safe process if it is active. After the step 455, the current execution cycle of the program segment ends.

In this embodiment, the rotational angle sensor 5 and the reference angular position sensor 6 correspond to and serve as the rotation signal outputting means in the previously-indicated summary of the invention. The step 104 of FIG. 4 corresponds to and serves as the actual measurement value calculating means in the previously-indicated summary of the invention. The portion of the step 105 of FIG. 4 for calculating the term "$(\omega_{n-1} - \omega_n)$" corresponds to and serves as the first variation amount calculating means in the previously-indicated summary of the invention. The portion of the step 105 of FIG. 4 for calculating the rotational speed variation amount $\Delta\omega_n$ corresponds to and serves as the second variation amount calculating means in the previously-indicated summary of the invention. The step 401 of FIG. 7 corresponds to and serves as the smoothing means in the previously-indicated summary of the invention. The step 402-1 of FIG. 7 corresponds to and serves as the consecutive misfire detecting means in the previously-indicated summary of the invention. The step 106 of FIG. 4 corresponds to and serves as the cylinder-dependent index calculating means in the previously-indicated summary of the invention. The steps 110, 111, 113, 114, and 115 correspond to and serve as the cylinder-dependent misfire decision value generating means in the previously-indicated summary of the invention. The step 116 of FIG. 4 corresponds to and serves as the intermittent misfire detecting means in the previously-indicated summary of the invention.

The misfire decision reference level $REFI_n$ may be set equal to the product of the value of the cumulative 50% point and the value of another factor depending on an index representing the distribution dispersion. One example of this factor is the cumulative 16% point or the standard deviation. In this case, it is preferable that the value of the factor decreases as the degree of the distribution dispersion increases.

In this embodiment, the distributions of the occurrence frequencies of the rotational speed variation amounts are generated for the respective engine cylinders. The distribution of the occurrence frequencies of the rotational speed variation amounts related to a misfiring engine cylinder tends to be appreciably different from that related to a normally operating engine cylinder. Thus, by setting the misfire decision reference level $REFI_n$ as previously described, it is possible to accurately detect the occurrence of misfires. Since the distributions of the occurrence frequencies of the rotational speed variation amounts are generated for the respective engine cylinders, it is possible to accurately detect the occurrence of misfires even at high engine speeds and low engine loads.

In this embodiment, it is possible to detect a misfiring engine cylinder (or cylinders) and also misfire-representing parameters and conditions (consecutive misfires, intermittent misfires, and a misfire rate). The warning lamp 12 may be activated in response to the result of this detection. In addition, a memory may be provided to store the detected information.

The process of detecting the occurrence of consecutive misfires may be omitted from this embodiment.

The cumulative 16% point and the cumulative 33% relative to the cumulative 50% point may be replaced by other cumulative percentage points such as a cumulative 10% point, a cumulative 20% point, and a cumulative 30% point.

SECOND EMBODIMENT

Figure 10:
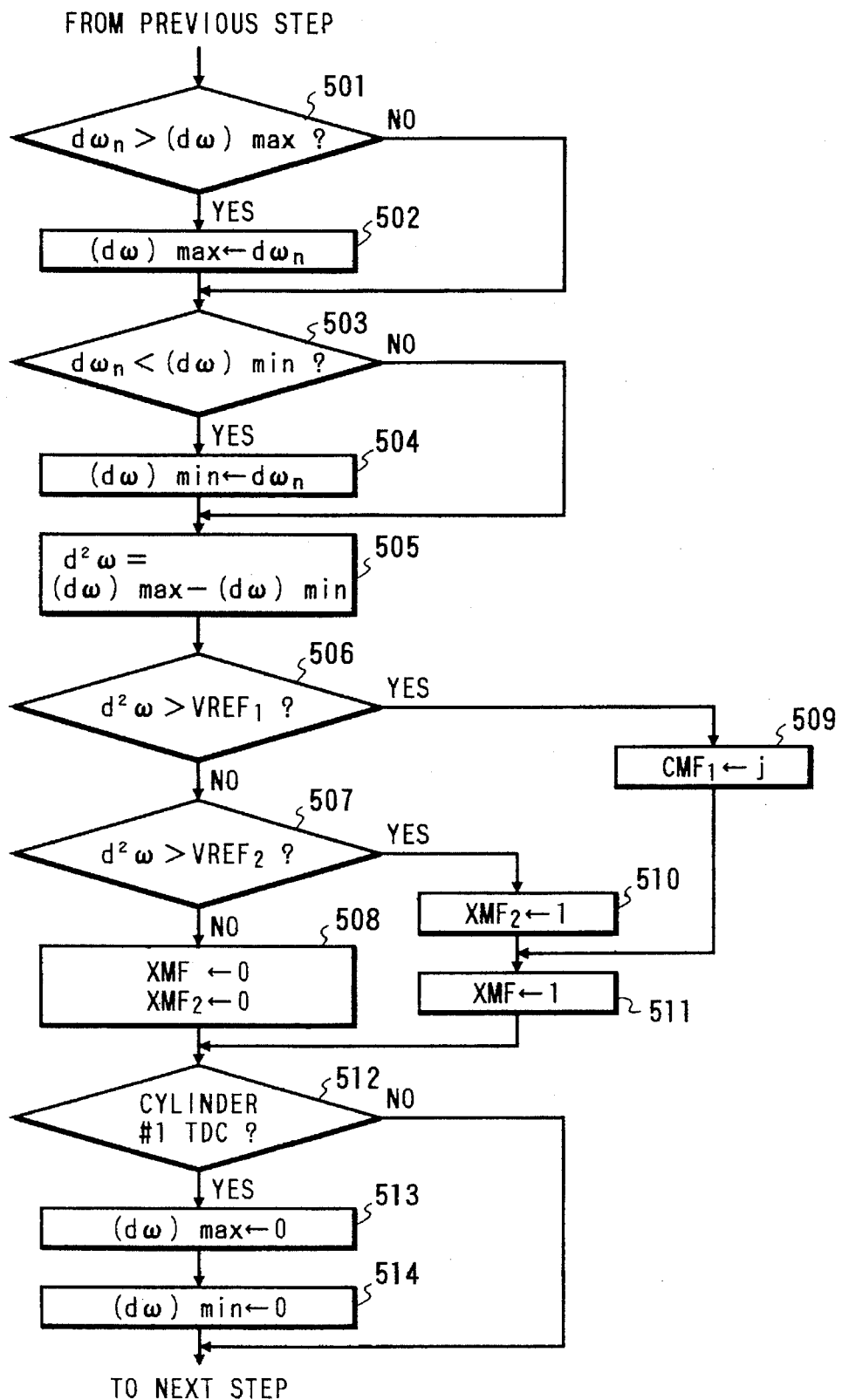
FIG. 10 is a flowchart of a segment of a control program for an ECU which is designed for detection of the occurrence of consecutive misfires according to a second embodiment of this invention.

A second embodiment of this invention is similar to the embodiment of FIGS. 1–9 except that the steps 402-1 and 402-2 of FIG. 7 are replaced by a sequence of steps 501–514 of FIG. 10. The sequence of the steps 501–514 is designed for detection of the occurrence of consecutive misfires.

In FIG. 10, a first step 501 which follows the step 401 of FIG. 7 compares a current mean rotational speed variation value $d\omega_n$ with a maximum value $(d\omega)max$ of previous mean rotational speed variation values. When the current mean rotational speed variation value $d\omega_n$ is greater than the maximum value $(d\omega)max$, the program advances from the step 501 to a step 502. Otherwise, the program jumps from the step 501 to a step 503.

The step 502 sets the maximum value $(d\omega)max$ equal to the current mean rotational speed variation value $d\omega_n$ according to the statement as "$(d\omega)max=d\omega_n$". After the step 502, the program advances to the step 503.

The step 503 compares the current mean rotational speed variation value $d\omega_n$ with a minimum value $(d\omega)min$ of the previous mean rotational speed variation values. When the current mean rotational speed variation value $d\omega_n$ is smaller than the minimum value $(d\omega)min$, the program advances from the step 503 to a step 504. Otherwise, the program jumps from the step 503 to a step 505.

The step 504 sets the minimum value $(d\omega)min$ equal to the current mean rotational speed variation value $d\omega_n$ according to the statement as "$(d\omega)min=d\omega_n$". After the step 504, the program advances to the step 505.

The step 505 calculates the difference $d^2\omega$ between the maximum value $(d\omega)max$ and the minimum value $(d\omega)min$ by referring to the following equation.

$$d^2\omega=(d\omega)max-(d\omega)min \qquad (9)$$

After the step 505, the program advances to a step 506.

The step 506 compares the difference $d^2\omega$ with a given misfire decision reference level VREF1. When the difference $d^2\omega$ is greater than the given misfire decision reference level VREF1, it is decided that an engine cylinder misfires. In this case, the program advances from the step 506 to a step 509. Otherwise, the program advances from the step 506 to a step 507.

The step 509 detects or identifies a misfiring engine cylinder, and sets a misfiring-cylinder denoting value CMF1 equal to the cylinder index number (the cylinder discrimination number) of the misfiring engine cylinder. The misfiring engine cylinder information CMF1 is stored into a memory within a ECU 9 (see FIG. 1). After the step 509, the program advances to a step 511.

The step 507 compares the difference $d^2\omega$ with a given misfire decision reference level VREF2. When the difference $d^2\omega$ is greater than the given misfire decision reference level VREF2, it is decided that plural engine cylinders misfire. In this case, the program advances from the step 507 to a step 510. Otherwise, the program advances from the step 507 to a step 508.

The step 510 sets a plural cylinder misfire decision flag XMF2 to "1". After the step 510, the program advances to the step 511 which sets a misfire decision flag XMF to "1". After the step 511, the program advances to a step 512.

The step 508 clears or resets the misfire decision flag XMF to "0". In addition, the step 508 clears or resets the plural cylinder misfire decision flag XMF2 to "0". In the absence of a misfire, the step 508 is executed so that both the misfire decision flags XMF and XMF2 are reset to "0". After the step 508, the program advances to the step 512.

The step 512 decides whether or not the timing of a current interruption process corresponds to an interruption timing (a TDC) of a first engine cylinder denoted by the character "#1". When the timing of the current interruption process corresponds to the interruption timing of the engine cylinder #1, the program advances from the step 512 to a step 513. Otherwise, the program advances from the step 512 to the step 403 of FIG. 7.

The step 513 resets the maximum value $(d\omega)max$ to "0". A step 514 following the step 513 resets the minimum value $(d\omega)min$ to "0". After the step 514, the program advances to the step 403 of FIG. 7.

As previously described, FIG. 8(a) shows an example of time-domain variations in the mean rotational speed variation values $d\omega_n$ which occur when all the engine cylinders operate normally. In addition, FIG. 8(b) shows an example of time-domain variations in the mean rotational speed variation values $d\omega_n$ which occur when a certain engine cylinder consecutively misfires and the other engine cylinders operate normally. When all the engine cylinders operate normally, there is only a small difference between the maximum value $(d\omega)max$ and the minimum value $(d\omega)min$ as shown in FIG. 8(a). On the other hand, when a certain engine cylinder consecutively misfires and the other engine cylinders operate normally, there is a great difference between the maximum value $(d\omega)max$ and the minimum value $(d\omega)min$ as shown in FIG. 8(b). Therefore, the occurrence of consecutive misfires can be detected by comparing the difference $d^2\omega$ of the equation (9) with the given misfire decision reference level VREF1.

This embodiment has advantages similar to those of the embodiment of FIGS. 1–9 in detection of the occurrence of misfires.

In this embodiment, it is possible to detect a misfiring engine cylinder (or cylinders) and also misfire-representing parameters and conditions (consecutive misfires, intermittent misfires, and a misfire rate). A warning lamp 12 (see FIG. 1) may be activated in response to the result of this detection. In addition, a memory may be provided to store the detected information.

The cumulative 16% point and the cumulative 33% relative to the cumulative 50% point may be replaced by other cumulative percentage points such as a cumulative 10% point, a cumulative 20% point, and a cumulative 30% point.

THIRD EMBODIMENT

Figure 11:
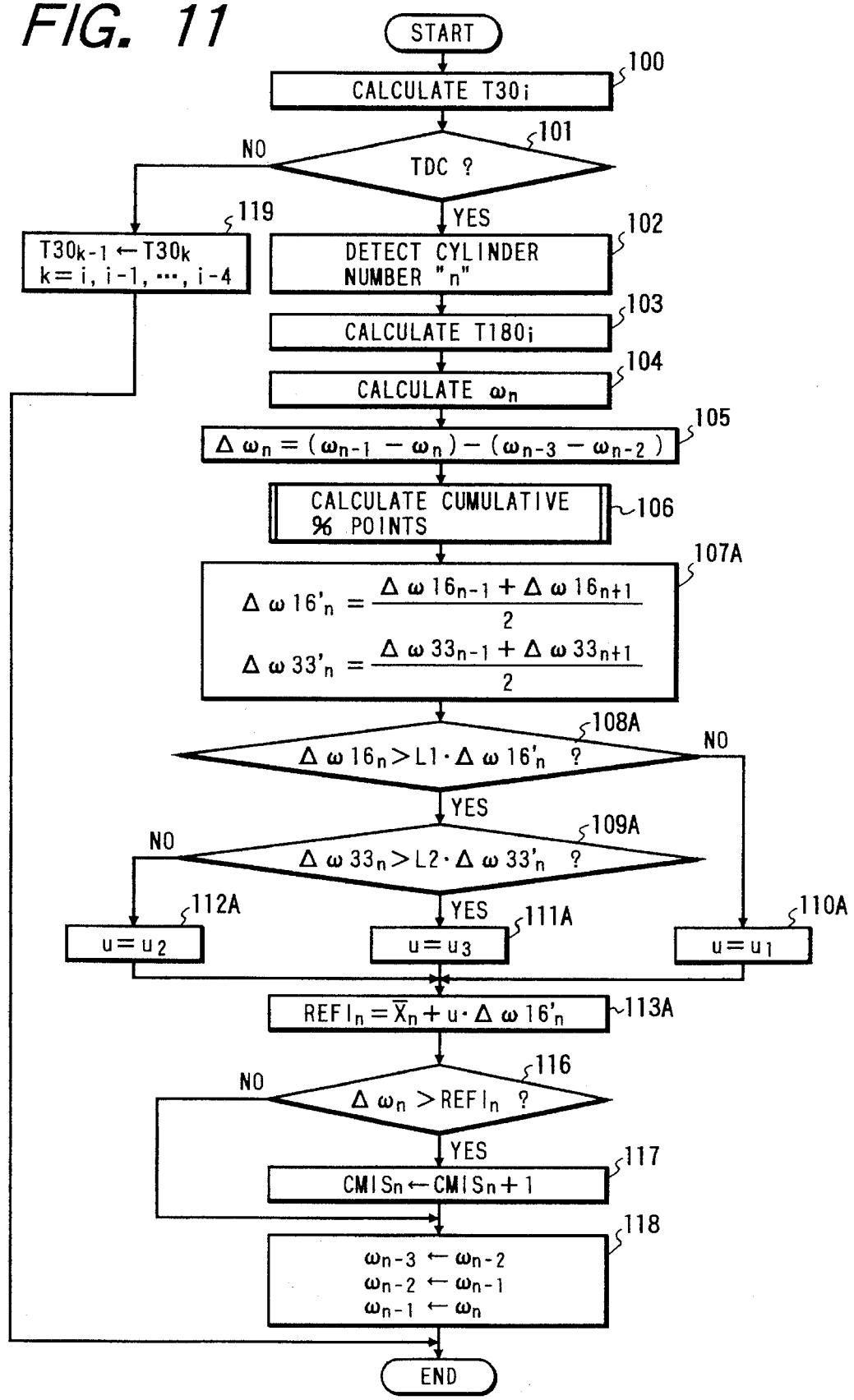
FIG. 11 is a flowchart of a segment of a control program for an ECU which is designed for detection of the occurrence of intermittent misfires according to a third embodiment of this invention.

A third embodiment of this invention is similar to the embodiment of FIGS. 1–9 except that the program segment of FIG. 4 is replaced by a program segment of FIG. 11 for detection of the occurrence of intermittent misfires. The program segment of FIG. 11 is started by an interruption process each time the crankshaft of an engine 1 (see FIG. 1) rotates by a predetermined angle, for example, 30 degrees (30° CA). In other words, the program segment of FIG. 11 is executed at every predetermined crankshaft rotational angle, for example, 30° CA The interruption process for starting the program segment of FIG. 11 is responsive to, for example, the output signal of a rotational angle sensor 5 (see FIG. 1).

The program segment of FIG. 11 has steps 100, 101, 102, 103, 104, 105, 106, and 119 similar to the steps 100, 101, 102, 103, 104, 105, 106, and 119 of FIG. 4. A detailed description of the steps 100, 101, 102, 103, 104, 105, 106, and 119 in FIG. 11 will be omitted.

In the program segment of FIG. 11, the step 106 is followed by a step 107A. The step 107A calculates a mean value $\Delta\omega16_n'$ between the rotational speed variation amount $\Delta\omega16_{n-1}$ at the cumulative 16% point in an occurrence frequency distribution related to an engine cylinder immediately previously subjected to a misfire detecting process and the rotational speed variation amount $\Delta\omega16_{n+1}$ at the cumulative 16% point in an occurrence frequency distribution related to an engine cylinder which will be subjected to the misfire detecting process next. This calculation is executed by referring to the following equation.

$$\Delta\omega16_n'=(\Delta\omega16_{n-1}+\Delta\omega16_{n+1})/2 \quad (10)$$

It should be noted that the values $\Delta\omega16_{n-1}$ and $\Delta\omega16_{n+1}$ of the cumulative 16% points are measured with respect to the related cumulative 50% points $Xbar_{n-1}$ and $Xbar_{n+1}$ respectively.

In addition, the step 107A calculates a mean value $\Delta\omega33_n'$ between the rotational speed variation amount $\Delta\omega33_{n-1}$ at the cumulative 33% point in the occurrence frequency distribution related to the engine cylinder immediately previously subjected to the misfire detecting process and the rotational speed variation amount $\Delta\omega33_{n+1}$ at the cumulative 33% point in the occurrence frequency distribution related to the engine cylinder which will be subjected to the misfire detecting process next. This calculation is executed by referring to the following equation.

$$\Delta\omega33_n'=(\Delta\omega33_{n-1}+\Delta\omega33_{n+1})/2 \quad (11)$$

It should be noted that the values $\Delta\omega33_{n-1}$ and $\Delta\omega33_{n+1}$ of the cumulative 33% points are measured with respect to the related cumulative 50% points $Xbar_{n-1}$ and $Xbar_{n+1}$ respectively.

A step 108A following the step 107A decides whether or not the value $\Delta\omega16_n$ of the cumulative 16% point in an occurrence frequency distribution related to an "n" engine cylinder (which is currently subjected to the misfire detecting process) satisfies the following conditions.

$$\Delta\omega16_n > L1 \cdot \Delta\omega16_n' \quad (12)$$

where L1 denotes a predetermined constant greater than "1". It should be noted that the value $\Delta\omega16_n$ of the cumulative 16% point is measured with respect to the related cumulative 50% point $Xbar_n$. When the value $\Delta\omega16_n$ satisfies the above-indicated conditions (12), the program advances from the step 108A to a step 109A. On the other hand, when the value $\Delta\omega16_n$ does not satisfy the conditions (12), the misfire rate of the "n" engine cylinder is decided to be 16% or less. In this case, the program advances from the step 108A to a step 110A.

The step 110A sets a coefficient "u" to a given value u1 designed for a misfire rate of 16% or less. After the step 110A, the program advances to a step 113A.

The step 109A decides whether or not the value $\Delta\omega33_n$ of the cumulative 16% point in the occurrence frequency distribution related to the "n" engine cylinder satisfies the following conditions.

$$\Delta\omega33_n > L2 \cdot \Delta\omega33_n' \quad (13)$$

where L2 denotes a predetermined constant greater than "1". It should be noted that the value $\Delta\omega33_n$ of the cumulative 33% point is measured with respect to the related cumulative 50% point $Xbar_n$. When the value $\Delta\omega33_n$ satisfies the above-indicated conditions (13), the misfire rate of the "n" engine cylinder is decided to be 33% or more. In this case, the program advances from the step 109A to a step 111A. On the other hand, when the value $\Delta\omega33_n$ does not satisfy the conditions (13), the misfire rate of the "n" engine cylinder is decided to be between 16% and 33%. In this case, the program advances from the step 109A to a step 112A.

The step 111A sets then coefficient "u" to a given value u3 designed for a misfire rate of 33% or more. After the step 111A, the program advances to the step 113A.

The step 112A sets the coefficient "u" to a given value u2 designed for a misfire rate between 16% and 33%. After the step 112A, the program advances to the step 113A.

The step 113A calculates a misfire decision reference level $REFI_n$ for the "n" engine cylinder by referring to the following equation.

$$REFI_n = Xbar_n + u \cdot \Delta\omega16_n' \quad (14)$$

where $Xbar_n$ denotes a base value equal to the value of the related cumulative 50% point.

A step 116 following the step 113A compares the rotational speed variation amount $\Delta\omega_n$ given by the step 105 and the misfire decision reference level $REFI_n$ given by the step 113A. The step 116 and subsequent steps 117 and 118 are similar to those of FIG. 4. A detailed description of the steps 116, 117, and 118 will be omitted.

In the program segment of FIG. 11, the given values u1, u2, and u3 are chosen to satisfy the relation as "u1>u2>u3" for the reason as follows. The value $\Delta\omega16_n'$ used in the calculation of the misfire decision reference level $REFI_n$ agrees with a mean between the amount $\Delta\omega16_{n-1}$ related to the "n-1" engine cylinder and the amount $\Delta\omega16_{n+1}$ related to the "n+1" engine cylinder. Therefore, the mean value $\Delta\omega16_n'$ remains approximately at a constant value even when the misfire rate of the "n" engine cylinder increases. On the other hand, the value $Xbar_n$ of the cumulative 50% point increases as the misfire rate of the "n" engine cylinder increases. To suppress an increase of the misfire decision reference level $REFI_n$ in response to an increase of the misfire rate, the coefficient "u" is set smaller as the misfire rate increases.

In cases where the "n" engine cylinder misfires only at this time, the misfire is prevented from adversely affecting the misfire decision reference level $REFI_n$ for the "n" engine cylinder since the misfire decision reference level $REFI_n$ is determined on the basis of the mean value $\Delta\omega16_n'$ related to the "n-1" engine cylinder and the "n+1" engine cylinder as previously described. Such a stable misfire decision reference level $REFI_n$ enables accurate detection of the occurrence of misfires.

The values L1 and L2 may be varied as a function of a rotational engine speed. In this case, a ROM 9b (see FIG. 1) is previously loaded with a table or a one-dimensional map providing a desired relation between the value L1 and the rotational engine speed, and also a table or a one-dimensional map providing a desired relation between the value L2 and the rotational engine speed. During the execution of the misfire detecting process, the values L1 and L2 are read out from the ROM 9b in accordance with the current rotational engine speed. This design compensates for changes of the rotational speed variation amounts in response to a change of the rotational engine speed. Therefore, it is possible to accurately detect the occurrence of misfires.

This embodiment can be applied to a six-cylinder engine, an eight-cylinder engine, and other cylinder-number engines.

As understood from the previous description, the program segment of FIG. 11 uses the values of the cumulative 16% points and the cumulative 33% points in the calculation of the mean values $\Delta\omega 16_{n'}$ and $\Delta\omega 33_{n'}$. The program segment of FIG. 11 may use the values of other cumulative percentage points related to engine cylinders different from the engine cylinder separated in operation stroke from the "n" engine cylinder by 360° CA. It should be noted that the misfire-dependent factor related to the engine cylinder separated from the "n" engine cylinder by 360° CA is affected by the occurrence of a misfire in the "n" engine cylinder. In the case of a six-cylinder engine, a mean value $\Delta\omega 16_{n'}$ may be calculated between the values of the cumulative 16% points related to engine cylinders other than the "n" engine cylinder and the engine cylinder separated from the "n" engine cylinder by 360° CA. Alternatively, a mean value $\Delta\omega 16_{n'}$ may be calculated between the values of the cumulative 16% points related to the "n–1" engine cylinder and the "n–2" engine cylinder which precede the "n" engine cylinder.

In this embodiment, it is possible to detect a misfiring engine cylinder (or cylinders) and also misfire-representing parameters and conditions (consecutive misfires, intermittent misfires, and a misfire rate). A warning lamp 12 (see FIG. 1) may be activated in response to the result of this detection. In addition, a memory may be provided to store the detected information.

The process of detecting the occurrence of consecutive misfires may be omitted from this embodiment.

The cumulative 16% point and the cumulative 33% relative to the cumulative 50% point may be replaced by other cumulative percentage points such as a cumulative 10% point, a cumulative 20% point, and a cumulative 30% point.

FOURTH EMBODIMENT

Figure 12:
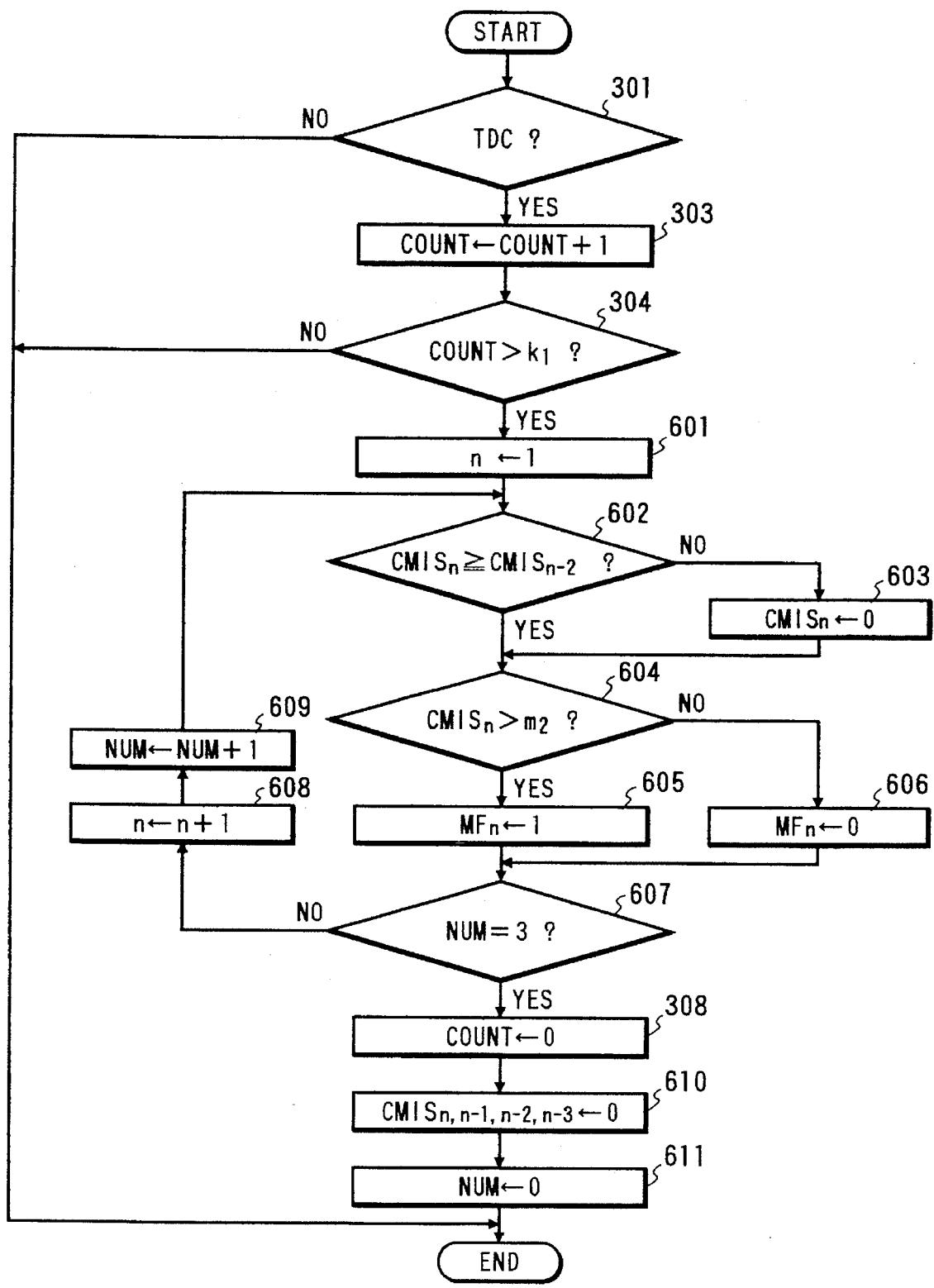
FIG. 12 is a flowchart of a segment of a control program for an ECU which is designed for detection of the occurrence of serious misfiring conditions according to a fourth embodiment of this invention.

A fourth embodiment of this invention is similar to the embodiment of FIGS. 1–9 except that the program segment of FIG. 6 is replaced by a program segment of FIG. 12 for detection of the occurrence of serious misfires. The program segment of FIG. 12 is started by an interruption process each time the crankshaft of an engine 1 (see FIG. 1) rotates by a predetermined angle, for example, 30 degrees (30° CA). In other words, the program segment of FIG. 12 is executed at every predetermined crankshaft rotational angle, for example, 30° CA. The interruption process for starting the program segment of FIG. 12 is responsive to, for example, the output signal of a rotational angle sensor 5 (see FIG. 1).

The program segment of FIG. 12 has steps 301, 303, and 304 similar to the steps 301, 303, and 304 of FIG. 6. A detailed description of the steps 301, 303, and 304 in FIG. 12 will be omitted.

In the program segment of FIG. 12, when the step 304 decides the value of a decision counter COUNT to be greater than a given value k1, the program advances from the step 304 to a step 601 which sets a cylinder discrimination number "n" to "1". After the step 601, the program advances to a step 602.

The step 602 compares the value of the tentative misfire counter $CMIS_n$ for the "n" engine cylinder and the value of the tentative misfire counter $CMIS_{n-2}$ for the "n–2" engine cylinder. When the value of the tentative misfire counter $CMIS_n$ is smaller than the value of the tentative misfire counter $CMIS_{n-2}$, the program advances from the step 602 to a step 603. When the value of the tentative misfire counter $CMIS_n$ is equal to or greater than the value of the tentative misfire counter $CMIS_{n-2}$, the program jumps from the step 602 to a step 604.

The step 603 clears or resets the tentative misfire counter $CMIS_n$ to "0". After the step 603, the program advances to the step 604. In this way, when the value of the tentative misfire counter $CMIS_n$ is smaller than the value of the tentative misfire counter $CMIS_{n-2}$, the tentative misfire counter $CMIS_n$ is cleared to "0". The reason for this clearance is as follows.

It is now assumed that the "n–2" engine cylinder preceding the "n" engine cylinder by 360° CA misfires. In this case, the distribution of the occurrence frequencies of the rotational speed variation amounts related to the "n" engine cylinder is changed into the configuration of FIG. 3(c) by the misfire in the "n–2" engine cylinder so that the value of the cumulative 50% point in the distribution decreases. As a result, there occurs a reduction of the misfire decision reference level $REFI_n$ for the "n" engine cylinder which is calculated according to the equation (3) or the equation (14). The reduction of the misfire decision reference level $REFI_n$ tends to lower the reliability of the misfire decision executed by the step 116 of FIG. 4. In general, the value of the tentative misfire counter CMIS of a misfiring engine cylinder (the "n–2" engine cylinder) is greater than that of an engine cylinder (the "n" engine cylinder) affected by the misfire. Thus, when the value of the tentative misfire counter $CMIS_n$ is smaller than the value of the tentative misfire counter $CMIS_{n-2}$, it is thought that the "n–2" engine cylinder misfires. In such a case, it is decided that the misfire-dependent factor related to the "n" engine cylinder is adversely affected by the misfire, and the value of the tentative misfire counter $CMIS_n$ of the "n" engine cylinder is cleared to prevent a wrong misfire decision.

The step 604 compares the value of the tentative misfire counter $CMIS_n$ of the "n" engine cylinder with a predetermined value m2. When the value of the tentative misfire counter $CMIS_n$ is greater than the predetermined value m2, the program advances from the step 604 to a step 605. Otherwise, the program advances from the step 604 to a step 606.

The step 605 sets a misfire flag $MF_n$ of the "n" engine cylinder to "1" representing that the "n" engine cylinder seriously misfires. After the step 605, the program advances to a step 607.

The step 606 sets a misfire flag $MF_n$ of the "n" engine cylinder to "0" representing that the "n" engine cylinder does not seriously misfire. After the step 606, the program advances to the step 607.

The step 607 compares the value of a decision time number counter NUM with three to determine whether or not the misfire decisions have been executed on all the engine cylinders. It should be noted that the decision time number counter NUM is a variable used as a counter. When the value of the decision time number counter NUM is equal to three, that is, when the misfire decisions have been executed on all the engine cylinders, the program advances from the step 607 to a step 308. Otherwise, the program advances from the step 607 to a step 608.

The step 608 increments the cylinder discrimination number "n" by "1" according to the statement as "n=n+1". A step 609 following the step 608 increments the decision time number counter NUM by "1" according to the statement as "NUM=NUM+1". After the step 609, the program returns to the step 602. As a result, the set of the steps 602–606 is executed for each of all the engine cylinders.

The step 308 clears or resets the decision counter COUNT to "0". A step 610 following the step 308 clears or resets the tentative misfire counters $CMIS_n$, $CMIS_{n-1}$, $CMIS_{n-2}$, and $CMIS_{n-3}$ to "0". A step 611 following the step 610 clears or resets the decision time number counter NUM to "0". After the step 611, the current execution cycle of the program segment ends.

As previously described, there tends to occur a reduction of the misfire decision reference level for an engine cylinder affected by a misfire in another engine cylinder. The value of the tentative misfire counter CMIS of the former engine cylinder is cleared so that a wrong misfire decision can be prevented regarding that engine cylinder.

The step 602 may be modified as follows. The modified step 602 compares the cumulative 50% point $Xbar_n$ related to the "n" engine cylinder and the cumulative 50% point $Xbar_{n-2}$ related to the "n-2" engine cylinder. In this case, when the value of the cumulative 50% point $Xbar_n$ is smaller than the value of the cumulative 50% point $Xbar_{n-2}$, the program advances from the step 602 to the step 603. Otherwise, the program advances from the step 602 to the step 604.

The step 603 may be omitted. In this case, when the value of the tentative misfire counter $CMIS_n$ is decided to be smaller than the value of the tentative misfire counter $CMIS_{n-2}$ by the step 602, the program advances from the step 602 to the step 606.

In this embodiment, it is possible to detect a misfiring engine cylinder (or cylinders) and also misfire-representing parameters and conditions (consecutive misfires, intermittent misfires, and a misfire rate). A warning lamp 12 (see FIG. 1) may be activated in response to the result of this detection. In addition, a memory may be provided to store the detected information.

The process of detecting the occurrence of consecutive misfires may be omitted from this embodiment.

The cumulative 16% point and the cumulative 33% relative to the cumulative 50% point may be replaced by other cumulative percentage points such as a cumulative 10% point, a cumulative 20% point, and a cumulative 30% point.

FIFTH EMBODIMENT

A fifth embodiment of this invention is similar to the embodiment of FIGS. 1–9 except for design changes indicated later.

First, a way of detecting the intermittent occurrence of misfires will now be briefly described.

Regarding every engine cylinder, a rotational speed variation amount $\Delta\omega_n$ is calculated by referring to the following equation.

$$\Delta\omega_n = (\omega_{n-1} - \omega_n) - (\omega_{n-5} - \omega_{n-4}) \quad (15)$$

where "n" denotes a cylinder discrimination number; "$\omega_n$" denotes the latest rotational engine speed which occurs during an expansion stroke of the "n" engine cylinder; "$\omega_{n-1}$" denotes the latest rotational engine speed which occurs during an expansion stroke of the "n-1" engine cylinder which immediately precedes the "n" engine cylinder in the ignition sequence; "$\omega_{n-4}$" denotes the second latest rotational engine speed which occurs during the expansion stroke of the "n" engine cylinder (same as the "n-4" engine cylinder); and "$\omega_{n-5}$" denotes the second latest rotational engine speed which occurs during the expansion stroke of the "n-1" engine cylinder (same as the "n-5" engine cylinder).

According to the equation (15), a calculation is periodically given of the first difference (the first variation amount) between the rotational engine speeds which occur during the expansion strokes of the engine cylinder in question and the immediately preceding engine cylinder in the ignition sequence, and a calculation is periodically given of the second difference between the current first difference and the immediately preceding first difference. The rotational speed variation amount $\Delta\omega_n$ (the second variation amount) for the engine cylinder in question is determined on the basis of the second difference.

Figure 13A:
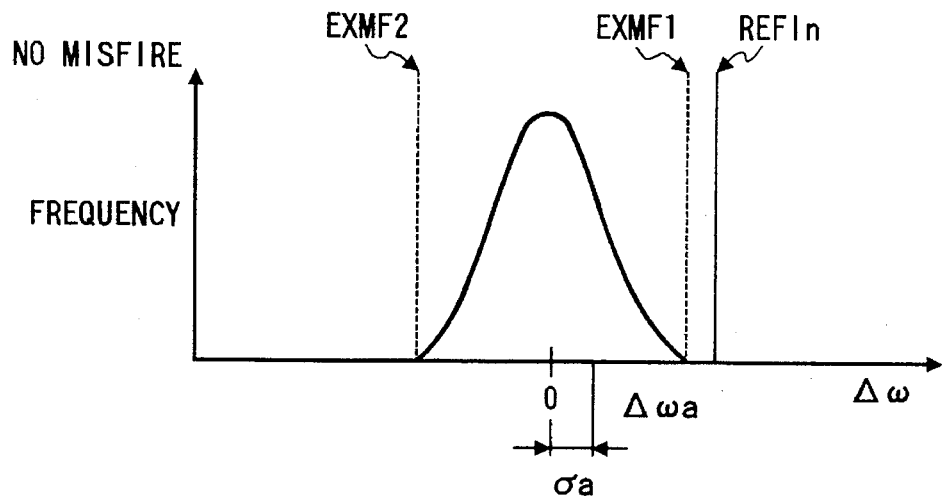
FIG. 13(a) is a diagram Of an occurrence frequency distribution of rotational speed variation amounts which occur when an engine operates normally without misfiring.
Figure 13B:
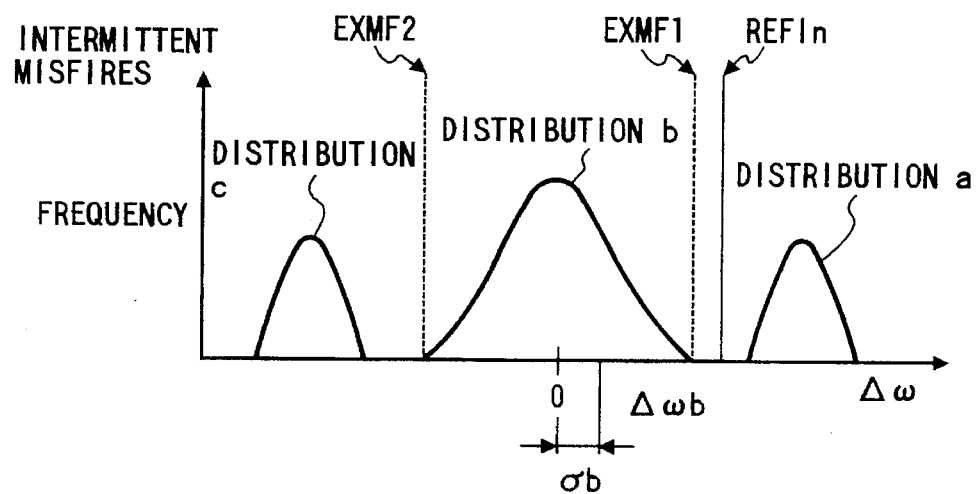
FIG. 13(b) is a diagram of an occurrence frequency distribution of rotational speed variation amounts which occur when one engine cylinder intermittently misfires at a given rate and other engine cylinders operate normally.
Figure 13C:
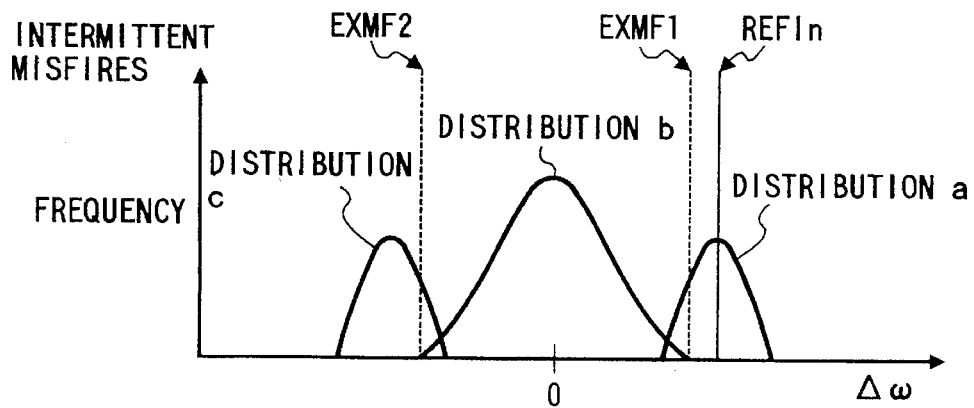
FIG. 13(c) is a diagram of an occurrence frequency distribution of rotational speed variation amounts which occur when one engine cylinder intermittently misfires at a given rate and other engine cylinders operate normally.

As shown in FIG. 13(a), when an engine 1 operates normally without misfiring, the occurrence frequencies of rotational speed variation amounts $\Delta\omega$ related to one of the engine cylinders have a normal distribution centered at the point "0". As shown in FIGS. 13(b) and 13(c), in cases where one of the cylinders of the engine 1 intermittently misfires at a given rate and the other cylinders operate normally during a plurality of successive engine operation cycles, the occurrence frequencies of rotational speed variation amounts $\Delta\omega$ related to the misfiring cylinder are in a distribution having three heaps "a", "b", and "c". In FIGS. 13(b) and 13(c), the heap "a" is caused by every misfire while the heap "b" is caused by normal ignition without being affected by a misfire. In addition, the heap "c" is caused by normal ignition with being affected by a misfire. In some cases, as shown in FIG. 13(b), the heaps "a", "b", and "c" are separated from each other. In other cases, as shown in FIG. 13(c), the neighboring heaps "a", "b", and "c" partially overlap each other.

In FIG. 13(a), "$\Delta\omega a$" denotes a cumulative 16% point at which the cumulation of the occurrence frequencies of higher rotational speed variation amounts $\Delta\omega$ reaches 16%, and "$\sigma a$" denotes the standard deviation of the occurrence frequency distribution of the rotational speed variation amounts $\Delta\omega$. The value of the cumulative 16% point and the standard deviation correspond to indexes representing the degree of the dispersion of the occurrence frequency distribution of the rotational speed variation amounts $\Delta\omega$. Since the occurrence frequency distribution of the rotational speed variation amounts $\Delta\omega$ is of the normal type as previously described, the value of the cumulative 16% point $\Delta\omega a$ and the value of the standard deviation $\sigma a$ are approximately equal to each other.

In FIG. 13(b), the normal-ignition heap "b" without being affected by a misfire agrees with a normal distribution curve. In FIG. 13(b), "$\Delta\omega b$" denotes a cumulative 16% point at which the cumulation of the occurrence frequencies of higher rotational speed variation amounts $\Delta\omega$ in the heap "b" reaches 16%, and "$\sigma b$" denotes the standard deviation of the occurrence frequency distribution of the rotational speed variation amounts $\Delta\omega$ in the heap "b". Since the occurrence frequency distribution of the rotational speed variation amounts $\Delta\omega$ in the heap "b" is of the normal type as previously described, the value of the cumulative 16% point $\Delta\omega b$ and the value of the standard deviation $\sigma b$ are approximately equal to each other.

The occurrence frequency distribution of the rotational speed variation amounts $\Delta\omega$ in FIG. 13(a) is similar to the occurrence frequency distribution of the rotational speed variation amounts $\Delta\omega$ in the heap "b" in FIG. 13(b). Therefore, the standard deviations $\sigma a$ and $\sigma b$ are substantially equal to each other while the cumulative 16% point values $\Delta\omega a$ and $\Delta\omega b$ are also substantially equal to each other.

In FIGS. 13(a), 13(b), and 13(c), the character "EXMF1" denotes a first misfire exclusion level. The first misfire exclusion level EXMF1 is given by the product of a given value (for example, 3) and the mean value SGM of the standard deviations σ of the normal-ignition distributions "b" related to the respective engine cylinders. In general, the given value is chosen so as to exceed most of possible rotational speed variation amounts Δω related to normal ignition.

At high engine speeds and low engine loads, as shown in FIG. 13(c), the neighboring heaps "a", "b", and "c" partially overlap each other so that a part of the misfire-dependent heap "a" tends to enter the range below the first misfire exclusion level EXMF1. As a result, in such a case, the related standard deviation tends to increase. Since a range decided to be related to normal ignition depends on the standard deviation, the normal ignition decision range expands as the standard deviation increases. When the normal ignition range excessively expands, a decision regarding the occurrence of misfires tends to be less accurate.

In this embodiment, at high engine speeds and low engine loads, the standard deviation and the related normal ignition decision range are prevented from excessively increasing so that the accuracy of a misfire decision can be adequately maintained. Specifically, a divergency-preventing threshold value is provided, and the first misfire exclusion level EXMF1 is guarded or limited in response to the divergency-preventing threshold value when a standard deviation used in the calculation of the first misfire exclusion level EXMF1 exceeds the divergency-preventing threshold value. Thereby, the first misfire exclusion level EXMF1 and the normal ignition decision range are prevented from excessively increasing. For example, the divergency-preventing threshold value is given by the product of a given value and the mean value SGM of the standard deviations σ related to the respective engine cylinders.

An intermittent misfire decision reference level $REFI_n$ for every of the engine cylinders is given by the product of a given number (for example, 4) and the related standard deviation σ. A decision regarding whether or not intermittent misfires occur is executed by comparing a rotational speed variation amount and the intermittent misfire decision reference level $REFI_n$.

Even at high engine speeds and low engine loads, the standard deviation used in the calculation of the intermittent misfire decision reference level $REFI_n$ can be reliable so that the intermittent occurrence of misfires can be accurately detected.

Next, a way of detecting the consecutive occurrence of misfires will be briefly described.

Regarding every engine cylinder, a rotational speed variation amount $\Delta\omega_n$ is calculated by referring to the following equation.

$$\Delta\omega_n = (\omega_{n-1} - \omega_n) - (\omega_{n-3} - \omega_{n-2}) \quad (16)$$

where "n" denotes a cylinder discrimination number; "$\omega_n$" denotes the latest rotational engine speed which occurs during an expansion stroke of the "n" engine cylinder; "$\omega_{n-1}$" denotes the latest rotational engine speed which occurs during an expansion stroke of the "n−1" engine cylinder which immediately precedes the "n" engine cylinder in the ignition sequence; "$\omega_{n-2}$" denotes the latest rotational engine speed which occurs during an expansion stroke of the "n−2" engine cylinder which immediately precedes the "n−1" engine cylinder in the ignition sequence; and "$\omega_{n-3}$" denotes the latest rotational engine speed which occurs during an expansion stroke of the "n−3" engine cylinder which immediately precedes the "n−2" engine cylinder in the ignition sequence.

Figure 14:
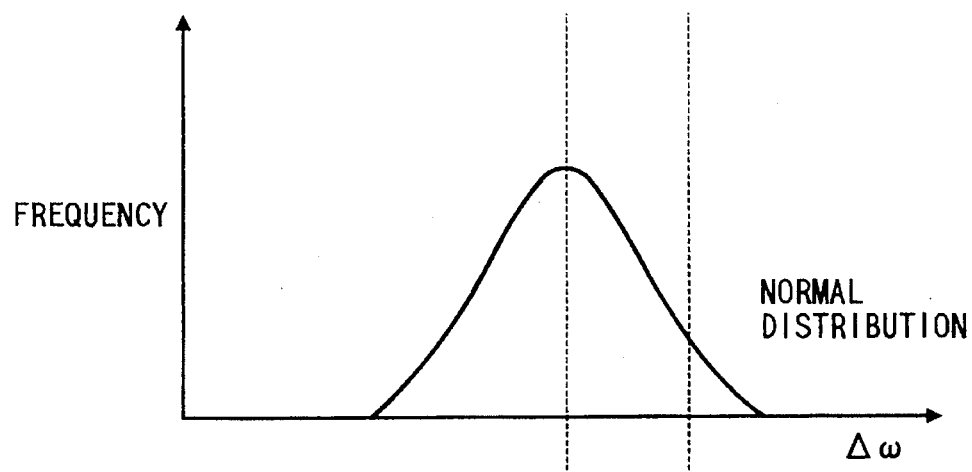
FIG. 14 is a diagram having a part (a) showing an occurrence frequency distribution of rotational speed variation amounts which occur when an engine operates normally without misfiring, and a part (b) showing an occurrence frequency distribution of rotational speed variation amounts which occur when one engine cylinder consecutively misfires and other engine cylinders operate normally.
Figure 14:
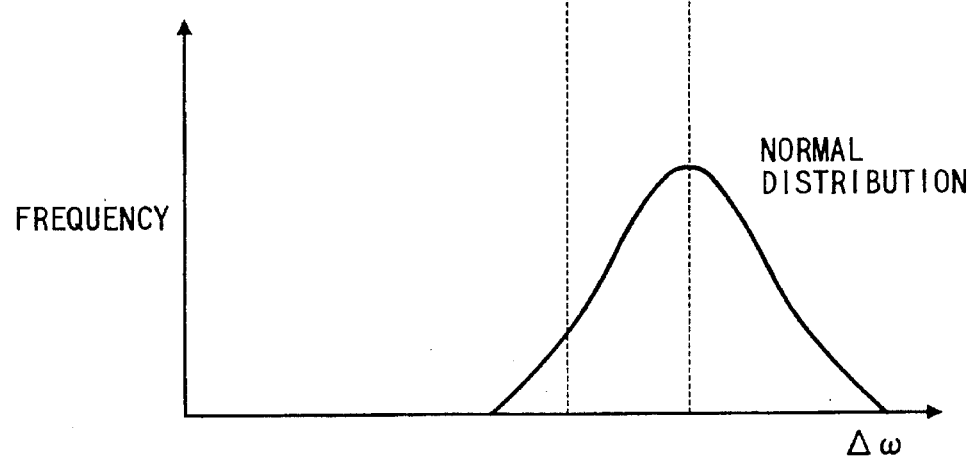

As shown in the part (a) of FIG. 14, when the engine 1 (see FIG. 1) operates normally without misfiring, the occurrence frequencies of rotational speed variation amounts Δω related to one of the engine cylinders have a normal distribution. As shown in the part (b) of FIG. 14, in cases where one of the cylinders of the engine 1 consecutively misfires and the other cylinders operate normally during a plurality of successive engine operation cycles, the occurrence frequencies of rotational speed variation amounts Δω related to the misfire cylinder have a normal distribution. Therefore, it is generally difficult to discriminate consecutively misfiring conditions from normal conditions by referring to the shape of the distribution of the occurrence frequencies of rotational speed variation amounts Δω.

A rotational speed variation amount Δω related to consecutively misfiring conditions tends to be greater than a rotational speed variation amount Δω related to normal conditions. Generally, the value of the cumulative 50% point in the occurrence frequency distribution of the rotational speed variation amounts Δω related to consecutively misfiring conditions is greater than the value of the cumulative 50% point in the occurrence frequency distribution of the rotational speed variation amounts Δω related to normal ignition. Accordingly, a consecutively misfiring engine cylinder can be detected by smoothing or integrating the rotational speed variation amounts Δω related to the respective engine cylinders, and comparing the smoothed rotational speed variation amounts with each other.

Figure 15:
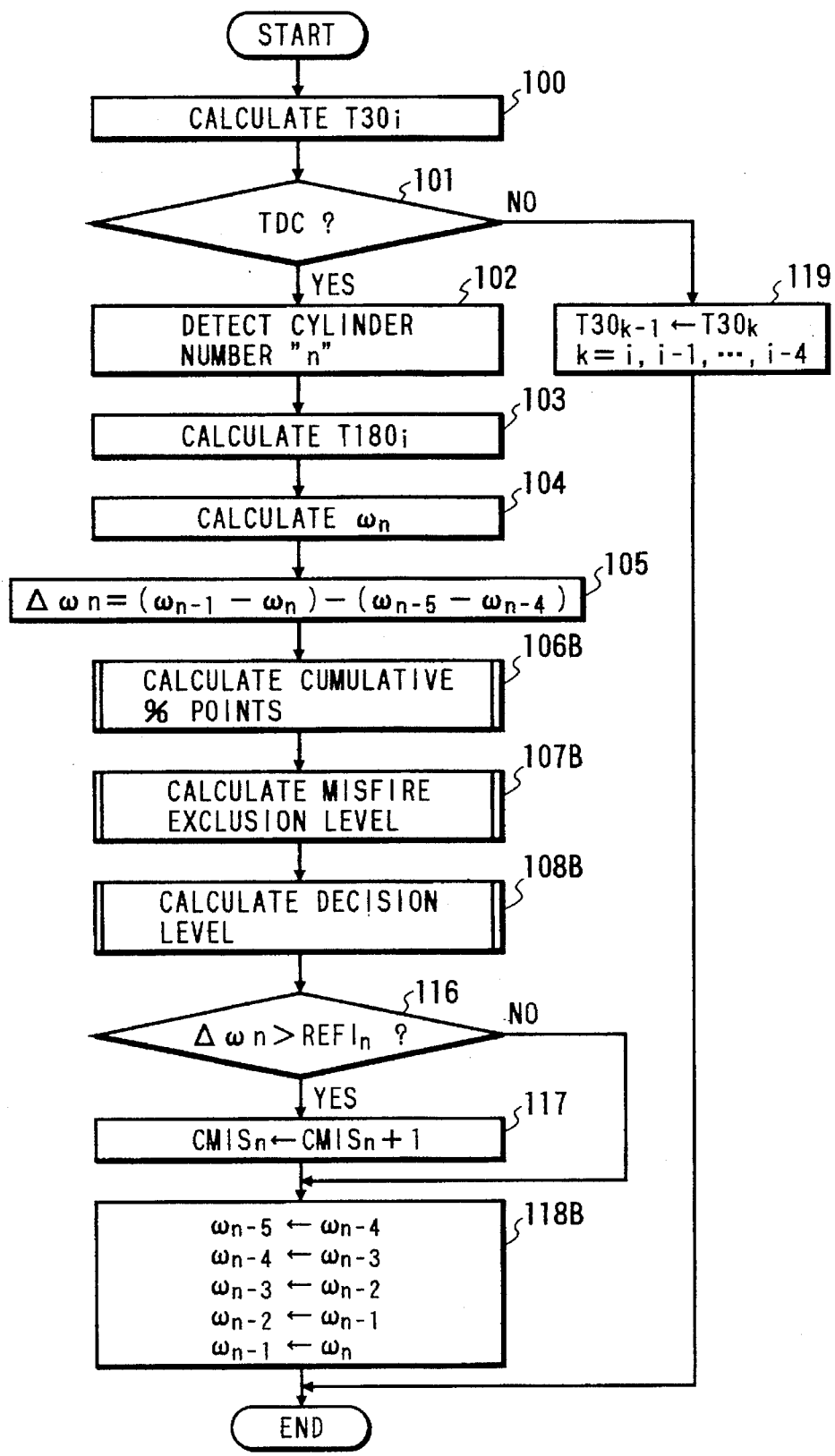
FIG. 15 is a flowchart of a segment of a control program for an ECU which is designed for detection of the occurrence of intermittent misfires according to a fifth embodiment of this invention.

An ECU 9 (see FIG. 1) serves to detect the occurrence of intermittent misfires and the occurrence of consecutive misfires by using the previously-mentioned ways. The ECU 9 operates in accordance with a control program stored in its internal ROM 9b (see FIG. 1). FIG. 15 is a flowchart of a segment of the control program which is designed for detection of the occurrence of intermittent misfires. The program segment of FIG. 15 is started by an interruption process each time the crankshaft of the engine 1 rotates by a predetermined angle, for example, 30 degrees (30° CA). In other words, the program segment of FIG. 15 is executed at every predetermined crankshaft rotational angle, for example, 30° CA The interruption process for starting the program segment of FIG. 15 is responsive to, for example, the output signal of a rotational angle sensor 5 (see FIG. 1).

As shown in FIG. 15, a first step 100 of the program segment calculates the difference between the moment of the start of the immediately preceding execution cycle of the program segment and the moment of the start of the current execution cycle of the program segment, and thereby determines a time $T30_i$ spent in rotation of the engine crankshaft by a crank angle of 30 degrees (30° CA).

A step 101 following the step 100 decides whether or not the timing of the current interruption process corresponds to a top dead center (TDC, a compression top dead center or an exhaust top dead center) of one of the engine cylinders. The step 101 may decide whether or not an expansion stroke of one of the engine cylinders has just terminated. When the timing of the current interruption process corresponds to a top dead center (TDC) of one of the engine cylinders, or when an expansion stroke of one of the engine cylinders has just terminated, the program advances from the step 101 to a step 102. Otherwise, the program advances from the step 101 to a step 119. The step 101 is responsive to, for example, the output signals of the rotational angle sensor 5 (see FIG. 1) and a reference angular position sensor 6 (see FIG. 1). The step 102 and subsequent steps are periodically executed at every crankshaft rotational angle of 180 degrees (180° CA) which corresponds to the ignition period in the engine 1.

The step 102 detects a current cylinder discrimination number "n" representing one of the engine cylinders about which a process of detecting the occurrence of intermittent misfires will be executed in the current execution cycle of the program segment. Specifically, the numerals "1", "2", "3", and "4" are previously assigned to the engine cylinders as different cylinder discrimination numbers respectively. The current cylinder discrimination number "n" is periodically updated among these numerals. The updating of the current cylinder discrimination number "n" is accorded with the ignition sequence of the engine cylinders. In the case where the ignition sequence of the engine cylinders is as "first cylinder-third cylinder-fourth cylinder-second cylinder", when "n" denotes the first cylinder, "n+1" denotes the third cylinder and "n−1" denotes the second cylinder. In some of other steps of the program segment, the cylinder discrimination number "n" is used as suffixes of variables. The suffixes mean that the related variables are assigned to the engine cylinder denoted by the corresponding cylinder discrimination number.

A step 103 following the step 102 sums up the current time $T30_i$ and the five preceding times $T30_{i-1}$, $T30_{i-2}$, $T30_{i-3}$, $T30_{i-4}$, and $T30_{i-5}$ to calculate a time $T180_i$ spent in rotation of the engine crankshaft by a crank angle of 180 degrees (180° CA). In the case of a six-cylinder engine, the step 103 is modified so as to sum up the current time $T30_i$ and the three preceding times $T30_{i-1}$, $T30_{i-2}$, and $T30_{i-3}$ to calculate a time $T120_i$ spent in rotation of the engine crankshaft by a crank angle of 120 degrees (120° CA).

A step 104 following the step 103 calculates a mean rotational engine speed (an average rotational engine speed) $\omega_n$ which occurs during a 180° -CA interval corresponding to an expansion stroke of the "n" engine cylinder. Specifically, the step 104 calculates the reciprocal of the time $T180_i$, and determines the mean rotational engine speed $\omega_n$ on the basis of the calculated reciprocal.

A step 105 following the step 104 calculates a rotational speed variation amount $\Delta\omega_n$ (a rotational rotational speed variation amount $\Delta\omega$) by referring to the following equation.

$$\Delta\omega_n = (\omega_{n-1} - \omega_n) - (\omega_{n-5} - \omega_{n-4}) \quad (17)$$

It should be noted that the equation (17) is equivalent to the previously-indicated equation (15).

In the case of a six-cylinder engine, the step 105 is modified so as to calculate a rotational speed variation amount $\Delta\omega_n$ (a rotational rotational speed variation amount $\Delta\omega$) by referring to the following equation.

$$\Delta\omega_n = (\omega_{n-1} - \omega_n) - (\omega_{n-7} - \omega_{n-6}) \quad (18)$$

In the equations (17) and (18): "$\omega_n$" denotes the mean rotational engine speed calculated by the step 104 during the current execution of the step 104 and related to the "n" engine cylinder (the engine cylinder identified by the cylinder discrimination number "n"); "$\omega_{n-1}$" denotes the mean rotational engine speed calculated by the step 104 during the first immediately preceding execution of the step 104 and related to the "n−1" engine cylinder (the engine cylinder identified by the cylinder discrimination number "n−1"); "$\omega_{n-4}$" denotes the mean rotational engine speed calculated by the step 104 during the fourth immediately preceding execution of the step 104 and related to the "n" engine cylinder; "$\omega_{n-5}$" denotes the mean rotational engine speed calculated by the step 104 during the fifth immediately preceding execution of the step 104 and related to the "n−1" engine cylinder; and "$\omega_{n-6}$" denotes the mean rotational engine speed calculated by the step 104 during the sixth immediately preceding execution of the step 104 and related to the "n" engine cylinder; and "$\omega_{n-7}$" denotes the mean rotational engine speed calculated by the step 104 during the seventh immediately preceding execution of the step 104 and related to the "n−1" engine cylinder.

A sequence of blocks 106B, 107B, and 108B following the step 105 determine a misfire decision reference level $REFI_n$ for the "n" engine cylinder. The details of the blocks 106B, 107B, and 108B will be described later. The block 108B is followed by a step 116.

The step 116 compares the rotational speed variation amount $\Delta\omega_n$ given by the step 105 and the misfire decision reference level $REFI_n$ given by the block 108B. When the rotational speed variation amount $\Delta\omega_n$ is greater than the misfire decision reference level $REFI_n$, it is decided that the "n" engine cylinder misfires in the latest expansion stroke. In this case, the program advances from the step 116 to a step 117. When the rotational speed variation amount $\Delta\omega_n$ is not greater than the misfire decision reference level $REFI_n$, it is decided that the "n" engine cylinder does not misfire in the latest expansion stroke. In this case, the program jumps from the step 116 to a step 118B.

The step 117 increments a tentative misfire counter $CMIS_n$ for the "n" engine cylinder by "1" according to the statement as "$CMIS_n = CMIS_n + 1$". It should be noted that the tentative misfire counter $CMIS_n$ is a variable used as a counter. The tentative misfire counter CMIS is provided for each of the engine cylinders so that four tentative misfire counters are present since the engine 1 (see FIG. 1) has four cylinders. The tentative misfire counter $CMIS_n$ is used in counting the number of times of decision that $\Delta\omega_n > REFI_n$ holds in the above-indicated misfire detecting process made for the "n" engine cylinder. The result of this counting is stored into a RAM 9c (see FIG. 1) within the ECU 9. After the step 117, the program advances to the step 118B.

As previously described, the tentative misfire counters CMIS are provided for the respective engine cylinders. The step 116 can detect which of the engine cylinders is misfiring. A warning lamp 12 (see FIG. 1) may be intermittently activated at a given period when the occurrence of misfires is detected. In this case, to inform the operator of a misfiring engine cylinder, it is preferable that the period of the activation of the warning lamp 12 depends on which of the engine cylinders is misfiring.

The step 118B updates the current cylinder discrimination number "n". In addition, the step 118B updates the values represented by the variables $\omega_{n-1}$, $\omega_{n-2}$, $\omega_{n-3}$, $\omega_{n-4}$, and $\omega_{n-5}$. Specifically, the value of the variable $\omega_{n-1}$ is set equal to the current mean rotational engine speed $\omega_n$. The value of the variable $\omega_{n-2}$ is set equal to the first immediately preceding mean rotational engine speed $\omega_{n-1}$. The value of the variable $\omega_{n-3}$ is set equal to the second immediately preceding mean rotational engine speed $\omega_{n-2}$. The value of the variable $\omega_{n-4}$ is set equal to the third immediately preceding mean rotational engine speed $\omega_{n-3}$. The value of the variable $\omega_{n-5}$ is set equal to the fourth immediately preceding mean rotational engine speed $\omega_{n-4}$. After the step 118B, the current execution cycle of the program segment ends. In the case of a six-cylinder engine, the step 118B is modified so that the value of the variable $\omega_{n-6}$ will be set equal to the fifth immediately preceding mean rotational engine speed $\omega_{n-5}$, and the value of the variable $\omega_{n-7}$ will be set equal to the sixth immediately preceding mean rotational engine speed $\omega_{n-6}$.

The step 119 updates the values of the variables $T30_{i-1}$, $T30_{i-2}$, $T30_{i-3}$, $T30_{i-4}$, and $T30_{i-5}$. Specifically, the value of the variable $T30_{i-1}$ is set equal to the current time $T30_i$. The value of the variable $T30_{i-2}$ is set equal to the first immediately preceding time $T30_{i-1}$. The value of the variable $T30_{i-3}$ is set equal to the second immediately preceding preceding time $T30_{i-2}$. The value of the variable $T30_{i-4}$ is set equal to the third immediately preceding preceding time $T30_{i-3}$. The value of the variable $T30_{i-5}$ is set equal to the fourth immediately preceding preceding time $T30_{i-4}$. After the step 119, the current execution cycle of the program segment ends.

A detailed description will now be given of the block 106B in FIG. 15. The block 106B calculates the cumulative 16% point (that is, the standard deviation) in the occurrence frequency distribution of the current and previous rotational speed variation amounts $\Delta\omega_n$ for the "n" engine cylinder.

Figure 16:
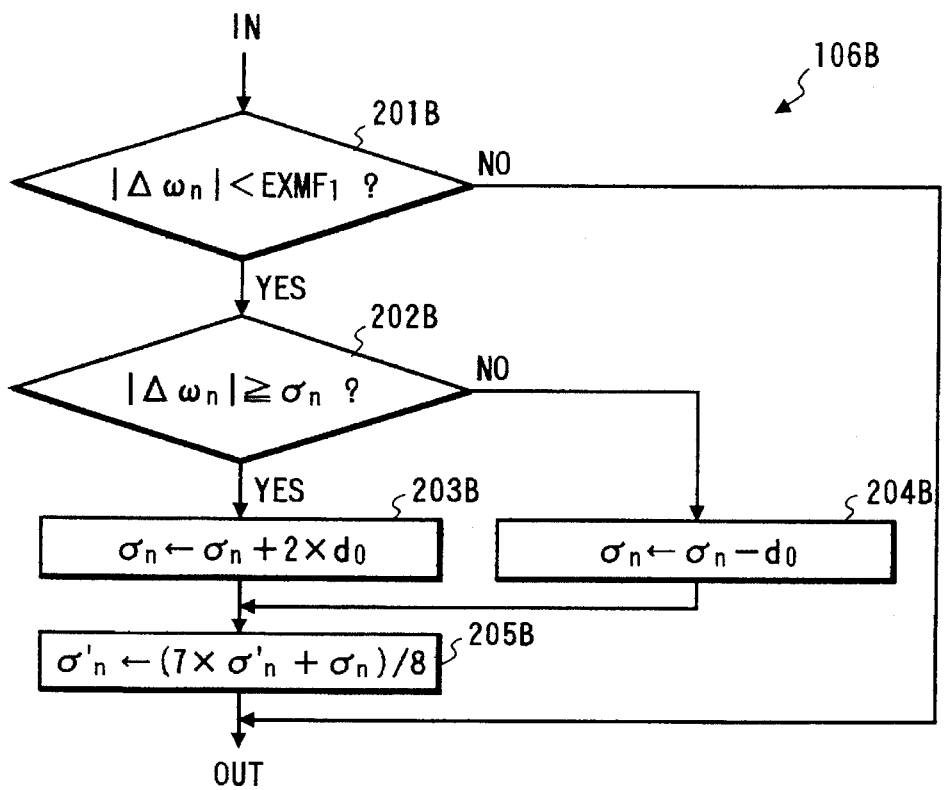
FIG. 16 is a flowchart of the details of a first block in FIG. 15.

As shown in FIG. 16, a first step 201B of the block 106B which follows the step 105 in FIG. 15 compares the absolute value of the latest rotational speed variation amount $\Delta\omega_n$ for the "n" engine cylinder with a first misfire exclusion level EXMF1 to determine whether the latest rotational speed variation amount $\Delta\omega_n$ is related to a normal condition or a misfiring condition. When the absolute value of the latest rotational speed variation amount $\Delta\omega_n$ is smaller than the first misfire exclusion level EXMF1, that is, when the latest rotational speed variation amount $\Delta\omega_n$ is related to a normal condition, the program advances from the step 201B to a step 202B. When the absolute value of the latest rotational speed variation amount $\Delta\omega_n$ is not smaller than the first misfire exclusion level EXMF1, that is, when the latest rotational speed variation amount $\Delta\omega_n$ is related to a misfiring condition, the program jumps from the step 201B to the block 107B in FIG. 15.

The step 202B compares the absolute value of the latest rotational speed variation amount $\Delta\omega_n$ for the "n" engine cylinder with a standard deviation $\sigma_n$ of the occurrence frequency distribution of the previous rotational speed variation amounts $\Delta\omega_n$ for the "n" engine cylinder. When the absolute value of the latest rotational speed variation amount $\Delta\omega_n$ is equal to or greater than the standard deviation $\sigma_n$, the program advances from the step 202B to a step 203B. Otherwise, the program advances from the step 202B to a step 204B.

The step 203B updates the standard deviation $\sigma_n$, and specifically increments the value $\sigma_n$ by twice a given value "αo" according to the statement as "$\sigma_n=\sigma_n+2\cdot\alpha o$". After the step 203B, the program advances to a step 205B.

The step 204B updates the standard deviation $\sigma_n$, and specifically decrements the value $\sigma_n$ by the given value "αo" according to the statement as "$\sigma_n=\sigma_n-\alpha o$". After the step 204B, the program advances to the step 205B.

As a result of the execution of the steps 203B and 204B, the latest value $\sigma_n$ is made approximately equal to the value of the cumulative 16% point in the distribution of the occurrence frequencies of the rotational speed variation amounts $\Delta\omega_n$ related to the "n" engine cylinder.

The step 205B calculates a mean or smoothed standard deviation $\sigma'_n$ for the "n" engine cylinder by referring to the statement as follows.

$$\sigma'_n=(7\cdot\sigma'_{n,-1}+\sigma_n)/8 \qquad (19)$$

where "$\sigma'_{n,-1}$" denotes the immediately preceding mean standard deviation for the "n" engine cylinder. Thus, the standard deviation $\sigma_n$ is smoothed or integrated in a time base into the mean rotational speed variation $\sigma_n$. After the step 205B, the program advances to the block 107B.

The step 201B excludes the rotational speed variation amounts $\Delta\omega_n$ related to misfires from the calculation of the standard deviations $\sigma_n$ and $\sigma'_n$.

The block 106B in FIG. 16 may be modified to use a second misfire exclusion level EXMF2. As shown in FIGS. 13(a), 13(b), and 13(c), the second misfire exclusion level EXMF2 is designed for separation between the misfire-independent frequency distribution "b" and the misfire-dependent frequency distribution "c". In this case, the block 106B excludes rotational speed variation amounts $\Delta\omega_n$ smaller than the second misfire exclusion level EXMF2 from the calculation of the standard deviations $\sigma_n$ and $\sigma'_n$.

A detailed description will now be given of the block 107B in FIG. 15. The block 107B follows the block 106B. The block 107B calculates the first misfire exclusion level EXMF1.

Figure 17:
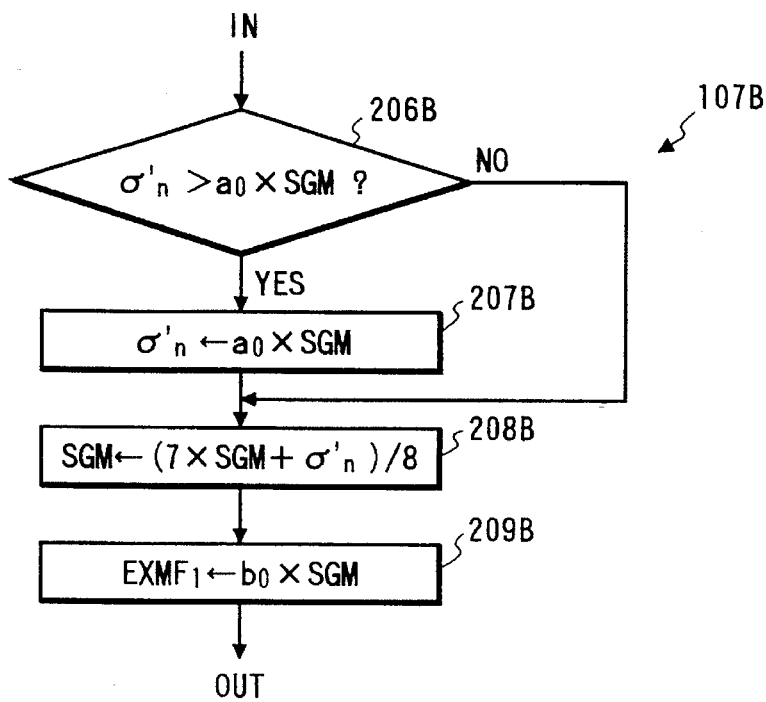
FIG. 17 is a flowchart of the details of a second block in FIG. 15.

As shown in FIG. 17, a first step 206B of the block 107B which follows the block 106B in FIG. 15 compares the smoothed standard deviation $\sigma'_n$ with the product of a given value "αo" and a mean value SGM. The product corresponds to a divergency-preventing threshold value. The mean value SGM is equal to a mean among the smoothed standard deviations $\sigma'_n$ for the respective engine cylinders. When the smoothed standard deviation $\sigma'_n$ is greater than the product "ao·SGM", the program advances from the step 206B to a step 207B. Otherwise, the program jumps from the step 206B to a step 208B.

The step 207B sets the value $\sigma'_n$ equal to the product "ao·SGM" according to the equation as "$\sigma'_n=ao\cdot SGM$". The steps 206B and 207B guard or limit the standard deviation for an intermittently misfiring engine cylinder, thereby preventing the standard deviation from excessively increasing or diverging. After the step 207B, the program advances to the step 208B.

The step 208B updates the mean value SGM according to the following statement.

$$SGM=(7\cdot SGM+\sigma'_n)/8 \qquad (20)$$

A step 209B following the step 208B sets the first misfire exclusion level EXMF1 equal to the product of a given value "bo" and the mean value SGM given by the step 208B. The given value "bo" is chosen so that the range of rotational speed variation amounts smaller than the first misfire exclusion level EXMF1 will contain a distribution of rotational speed variation amounts related to normal ignition. The given value "bo" is equal to, for example, 3. After the step 209B, the program advances to the block 108B in FIG. 15.

As previously described, the block 107B of FIG. 17 calculates the first misfire exclusion level EXMF1 from the mean SGM among the smoothed standard deviations $\sigma'_n$ for the respective engine cylinders. According to the function of the step 201B of the block 106B in FIG. 16, the rotational speed variation amounts $\Delta\omega_n$ equal to or greater than the first misfire exclusion level EXMF1 are excluded from the calculation of the standard deviations $\sigma_n$ and $\sigma'_n$. Therefore, even in cases where one of the engine cylinders misfires so that an occurrence frequency distribution of rotational speed variation amounts related to a normal ignition partially overlaps an occurrence frequency distribution of rotational speed variation amounts related to misfires, the standard deviation for the misfiring engine cylinder is prevented from excessively increasing or diverging.

The block 107B in FIG. 17 may be modified to also calculate the second misfire exclusion level EXMF2 from the mean SGM among the smoothed standard deviations $\sigma'_n$ for the respective engine cylinders.

A detailed description will now be given of the block 108B in FIG. 15. The block 108B follows the block 107B. The block 108B calculates the misfire decision reference level $REFI_n$.

Figure 18:
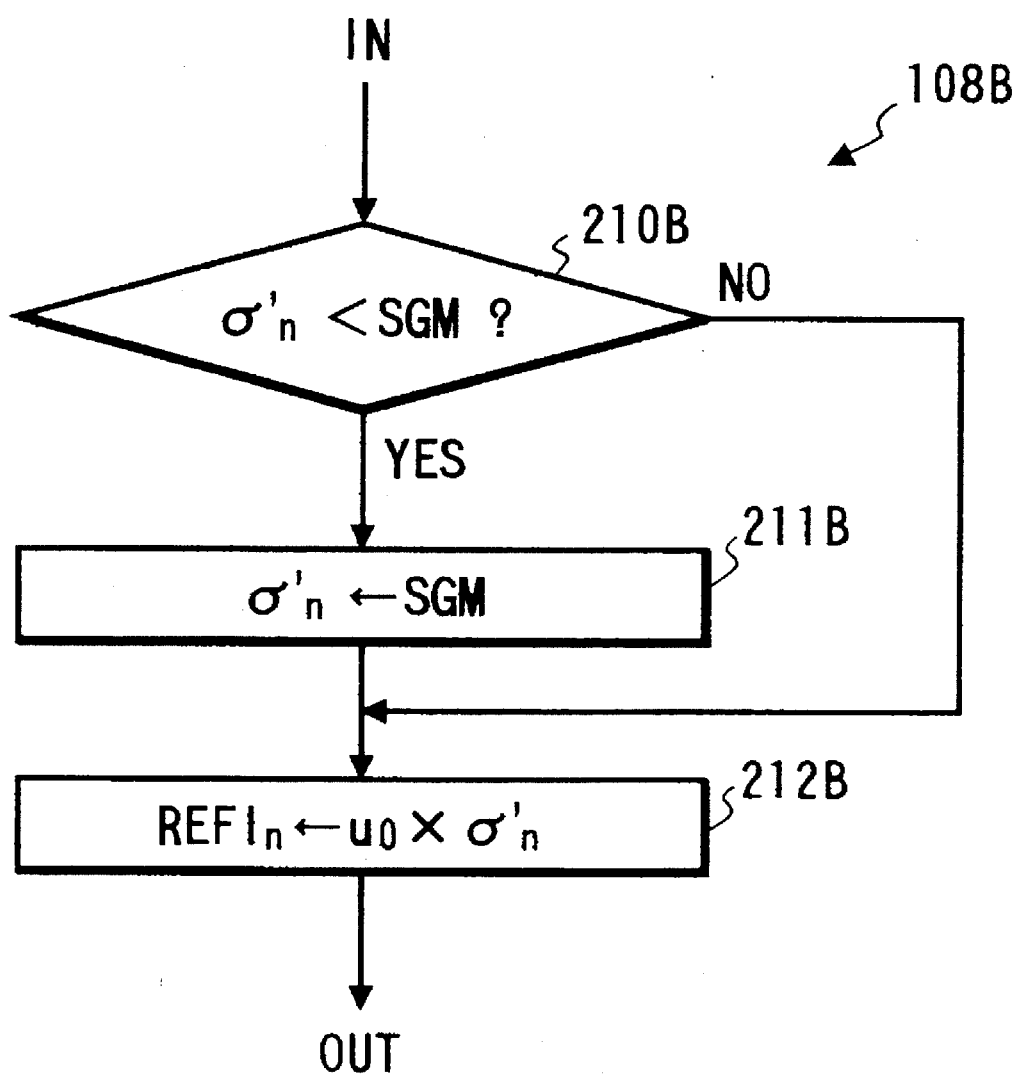
FIG. 18 is a flowchart of the details of a third block in FIG. 15.

As shown in FIG. 18, a first step 210B of the block 108B which follows the block 107B in FIG. 15 compares the smoothed standard deviation $\sigma'_n$ with the mean value SGM. When the smoothed standard deviation $\sigma'_n$ is smaller than the mean value SGM, the program advances from the step 210B to a step 211B. Otherwise, the program jumps from the step 210B to a step 212B.

The step 211B sets the value $\sigma'_n$ equal to the mean value SGM. The steps 210B and 211B cooperate to exclude the smoothed standard deviation $\sigma'_n$ smaller than the mean value SGM from the calculation of the misfire decision reference level $REFI_n$. It should be noted that such a small smoothed standard deviation $\sigma'_n$ tends to cause a less reliable misfire decision reference level $REFI_n$. After the step 211B, the program advances to the step 212B.

The step 212B sets the misfire decision reference level $REFI_n$ equal to the product of a given value "uo" and the smoothed standard deviation $\sigma'_n$. The given value "uo" is preferably in the range of about 3 to about 4. After the step 212B, the program advances to the step 116 in FIG. 15.

In the block 108B of FIG. 18, the misfire decision reference level $REFI_n$ is generated from the smoothed standard deviation $\sigma'_n$ of the normal distribution of the occurrence frequencies of the rotational speed variation amounts related to normal ignition. Accordingly, the generated misfire decision reference level $REFI_n$ can be reliable.

In this embodiment, the control program has a segment designed for detection of the occurrence of consecutive misfires. This program segment is similar to the program segment of FIG. 7, and a detailed description thereof will be omitted. It should be noted that this program segment may be modified to include the arrangement of FIG. 10.

In this embodiment, the control program has a segment designed for detection of the occurrence of serious misfires. This program segment is similar to the program segment of FIG. 6, and a detailed description thereof will be omitted.

What is claimed is:

1. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values, calculated by the actual measurement value calculating means, in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference;

smoothing means for smoothing the second variation amount calculated by the second variation amount calculating means into a third variation amount; and consecutive misfire detecting means for detecting misfire in response to the third variation amount.

2. The misfire detecting apparatus of claim 1, wherein the consecutive misfire detecting means comprises means for comparing a predetermined value and the third variation amount, and means for detecting misfire in response to a result of the comparing by the comparing means.

3. The misfire detecting apparatus of claim 2, further comprising intermittent misfire detecting means for detecting intermittent misfires which occur in one of cylinders of the engine.

4. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values calculated by the actual measurement value calculating means in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference;

smoothing means for smoothing the second variation amount calculated by the second variation amount calculating means into a third variation amount;

consecutive misfire detecting means for detecting misfire in response to the third variation amount, wherein the consecutive misfire detecting means comprises means for comparing a predetermined value and the third variation amount, and means for detecting misfire in response to a result of the comparing by the comparing means;

intermittent misfire detecting means for detecting intermittent misfires which occur in one of the cylinders of the engine;

cylinder-dependent index calculating means for calculating an index for every cylinder of the engine, the index representing a degree of a dispersion of an occurrence frequency distribution of second variation amounts calculated by the second variation amount calculating means; and cylinder-dependent misfire decision value generating means for generating a misfire decision value for every cylinder of the engine in response to the index calculated by the index calculating means, and the intermittent misfire detecting means comprising means for comparing the second variation amount calculated by the second variation amount calculating means and the misfire decision value generated by the misfire decision value generating means, and means for detecting intermittent misfires in response to a result of the comparison between the second variation amount and the misfire decision value.

5. The misfire detecting apparatus of claim 4, wherein the index calculated by the index calculating means agrees with a value of a cumulative percent point in the occurrence frequency distribution of the second variation amounts at which a cumulation of occurrence frequencies of higher second variation amounts reaches a predetermined percent;

and wherein the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points; and misfire rate decision value generating means for generating the misfire decision value in response to the misfire occurrence rate detected by the misfire occurrence rate detecting means.

6. The misfire detecting apparatus of claim 5, wherein the misfire rate decision value generating means comprises reference value calculating means for calculating a reference value from the second variation amount related to the cylinder about which misfire is to be detected; added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value caculating means into the misfire decision value.

7. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values, calculated by the actual measurement value calculating means, in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to twice a crank angle of 360 degrees in the engine, and for calculating a second variation amount in response to the calculated second difference;

smoothing means for smoothing the second variation amount calculated by the second variation amount calculating means into a third variation amount;

consecutive misfire detecting means for detecting misfire in response to the third variation amount, wherein the consecutive misfire detecting means comprises means for comparing a predetermined value and the third variation amount, and means for detecting misfire in response to a result of the comparing by the comparing means;

intermittent misfire detecting means for detecting intermittent misfires which occur in one of the cylinders of the engine;

cylinder-dependent index calculating means for calculating an index for every cylinder of the engine, the index representing a degree of a dispersion of an occurrence frequency distribution of second variation amounts calculated by the second variation amount calculating means and occurring during normal ignition; and cylinder-dependent misfire decision value generating means for generating a misfire decision value for every cylinder of the engine in response to the index calculated by the index calculating means, wherein the intermittent misfire detecting means is operative for comparing the second variation amount and the misfire decision value for every cylinder of the engine and thereby detecting intermittent misfires which occur in one of cylinders of the engine.

8. The misfire detecting apparatus of claim 1, wherein the consecutive misfire detecting means comprises means for calculating a maximum value of the third variation amount, means for calculating a minimum value of the third variation amount, and means for calculating a fourth variation amount in response to the maximum value of the third variation amount and the minimum value of the third variation amount, and means for detecting misfire in response to the fourth variation amount.

9. The misfire detecting apparatus of claim 8, further comprising intermittent misfire detecting means for detecting intermittent misfires which occur in one of cylinders of the engine.

10. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values calculated by the actual measurement value calculating means in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference;

smoothing means for smoothing the second variation amount calculated by the second variation amount calculating means into a third variation amount;

consecutive misfire detecting means for detecting misfire in response to the third variation amount, wherein the consecutive misfire detecting means comprises means for calculating a maximum value of the third variation amount, means for calculating a minimum value of the third variation amount, and means for calculating a fourth variation amount in response to the maximum value of the third variation amount and the minimum value of the third variation amount, and means for detecting misfire in response to the fourth variation amount;

intermittent misfire detecting means for detecting intermittent misfire which occur in one of the cylinders of the engine;

cylinder-dependent index calculating means for calculating an index for every cylinder of the engine, the index representing a degree of a dispersion of an occurrence frequency distribution of second variation amounts calculated by the second variation amount calculating means; and cylinder-dependent misfire decision value generating means for generating a misfire decision value for every cylinder of the engine in response to the index calculated by the index calculating means;

the intermittent misfire detecting means comprising means for comparing the second variation amount calculated by the second variation amount calculating means and the misfire decision value generated by the misfire decision value generating means, and means for detecting intermittent misfires in response to a result of the comparison between the second variation amount and the misfire decision value.

11. The misfire detecting apparatus of claim 10, wherein the index calculated by the index calculating means agrees with a value of a cumulative percent point in the occurrence frequency distribution of the second variation amounts at which a cumulation of occurrence frequencies of higher second variation amounts reaches a predetermined percent;

and wherein the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points; and misfire rate decision value generating means for generating the misfire decision value in response to the misfire occurrence rate detected by the misfire occurrence rate detecting means.

12. The misfire detecting apparatus of claim 11, wherein the misfire rate decision value generating means comprises reference value calculating means for calculating a reference value from the second variation amount related to the cylinder about which misfire is to be detected; added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value calculating means into the misfire decision value.

13. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values calculated by the actual measurement value calculating means in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to twice a crank angle of 360 degrees in the engine, and for calculating a second variation amount in response to the calculated second difference;

smoothing means for smoothing the second variation amount calculated by the second variation amount calculating means into a third variation amount;

consecutive misfire detecting means for detecting misfire in response to the third variation amount, wherein the consecutive misfire detecting means comprises means for calculating a maximum value of the third variation amount, means for calculating a minimum value of the third variation amount, and means for calculating a fourth variation amount in response to the maximum value of the third variation amount and the minimum value of the third variation amount, and means for detecting misfire in response to the fourth variation amount;

intermittent misfire detecting means for detecting intermittent misfires which occur in one of the cylinders on the engine;

cylinder-dependent index calculating means for calculating an index for every cylinder of the engine, the index representing a degree of a dispersion of an occurrence frequency distribution of second variation amounts calculated by the second variation amount calculating means and occurring during normal ignition; and cylinder-dependent misfire decision value generating means for generating a misfire decision value for every cylinder of the engine in response to the index calculated by the index calculating means, wherein the intermittent misfire detecting means is operative for comparing the second variation amount and the misfire decision value for every cylinder of the engine and thereby detecting intermittent misfires which occur in one of cylinders of the engine.

14. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values, calculated by the actual measurement value calculating means, in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 360 degrees in the engine, and for calculating a second variation amount in response to the calculated second difference;

cylinder-dependent index calculating means for calculating an index for every cylinder of the engine, the index representing a degree of a dispersion of an occurrence frequency distribution of second variation amounts calculated by the second variation amount calculating means;

cylinder-dependent misfire decision value generating means for generating a misfire decision value for every cylinder of the engine in response to the index calculated by the index calculating means; and intermittent misfire detecting means for comparing the second variation amount calculated by the second variation amount calculating means and the misfire decision value generated by the misfire decision value generating means, and for detecting intermittent misfires in response to a result of the comparison between the second variation amount and the misfire decision value.

15. The misfire detecting apparatus of claim 14, wherein the index calculated by the index calculating means agrees with a value of a cumulative percent point in the occurrence frequency distribution of the second variation amounts at which a cumulation of occurrence frequencies of higher second variation amounts reaches a predetermined percent; and wherein the misfire decision value generating means comprises misfire occurrence rate detecting means for comparing a cumulative percent point related to a cylinder about which misfire is to be detected at a present time and a cumulative percent point related to another cylinder, and for detecting a misfire occurrence rate related to the cylinder, about which misfire is to be detected at the present time, in response to a result of the comparison between the cumulative percent points; and misfire rate decision value generating means for generating the misfire decision value in response to the misfire occurrence rate detected by the misfire occurrence rate detecting means.

16. The misfire detecting apparatus of claim 15, wherein the misfire rate decision value generating means comprises reference value calculating means for calculating a reference value from the second variation amount related to the cylinder about which misfire is to be detected; added value calculating means for calculating an added value in response to an index calculated by the index calculating means which represents a degree of a dispersion of an occurrence frequency distribution related to at least one cylinder different from a cylinder preceding the cylinder about which misfire is to be detected by a crank angle of 360 degrees; and means for adding the reference value calculated by the reference value calculating means and the added value calculated by the added value calculating means into the misfire decision value.

17. A misfire detecting apparatus for an internal combustion engine, comprising:

rotation signal outputting means for outputting a rotation signal at every predetermined rotational angle in accordance with rotation of an output shaft of an internal combustion engine;

actual measurement value calculating means for measuring an interval of time spent in rotation between predetermined rotational angles in an expansion stroke of every cylinder of the engine in response to rotation signals outputted by the rotation signal outputting means, and for calculating an actual measurement value in response to the measured time interval;

first variation amount calculating means for calculating a first difference between actual measurement values, calculated by the actual measurement value calculating means, in two cylinders of the engine which successively fall into expansion strokes, and for calculating a first variation amount in response to the calculated first difference;

second variation amount calculating means for calculating a second difference between a current first variation amount calculated by the first variation amount calculating means and a previous first variation amount calculated by the first variation amount calculating means during a time which precedes a time of calculation of the current first variation amount by a period equal to an integer times a crank angle of 720 degrees in the engine, and for calculating a second variation amount in response to the calculated second difference;

cylinder-dependent index calculating means for calculating an index for every cylinder of the engine, the index representing a degree of a dispersion of an occurrence frequency distribution of second variation amounts calculated by the second variation amount calculating means and occurring during normal ignition;

misfire decision value generating means for generating a misfire decision value for every cylinder of the engine in response to the index calculated by the index calculating means; and misfire deciding means for comparing the second variation amount calculated by the second variation amount calculating means and the misfire decision value generated by the misfire decision value generating means, and for deciding whether or not misfire occurs in the engine in response to a result of the comparison between the second variation amount and the misfire decision value.

18. The misfire detecting apparatus of claim 17, wherein the index calculating means comprises misfire exclusion level calculating means for calculating a misfire exclusion level, and means for calculating the index in response to second variation amounts which are calculated by the second variation amount calculating means and which are smaller than the misfire exclusion level calculated by the misfire exclusion level calculating means.

19. The misfire detecting apparatus of claim 18, wherein the misfire exclusion level calculating means comprises guard means for guarding the index calculated by the index calculating means and for converting the index into a guarded index, and means for calculating the misfire exclusion level in response to the guarded index.

20. The misfire detecting apparatus of claim 17, wherein the misfire decision value generating means comprises means for calculating a product of a predetermined value and the index calculated by the index calculating means, and means for generating the misfire decision value in response to the product of the predetermined value and the index.

21. The misfire detecting apparatus of claim 20, wherein the misfire decision value generating means comprises means for calculating a means among indexes calculated by the index calculating means for the respective cylinders of the engine, means for deciding whether or not the index for a cylinder, about which the misfire decision value is to be generated, is smaller than the mean, and means for generating the misfire decision value in response to the mean when the index for the cylinder, about which the misfire decision value is to be generated, is smaller than the mean.

22. The misfire detecting apparatus of claim 17, further comprising consecutive misfire detecting means for detecting misfire consecutively occurring in one of the cylinders.

23. The misfire detecting apparatus of claim 1, wherein the smoothing means comprises means for smoothing a current value of the second variation amount calculated by the second variation amount calculating means with respect to a previous value of the second variation amount calculated by the second variation amount calculating means.

24. The misfire detecting apparatus of claim 1, wherein the smoothing means comprises first sub means for calculating a weighted mean between a previous value of the third variation amount and a current value of the second variation amount calculated by the second variation amount calculating means, and second sub means for calculating the third variation amount from the weighted mean calculated by the first sub means.

* * * * *